United States Patent
Jo et al.

(10) Patent No.: US 9,944,850 B2
(45) Date of Patent: Apr. 17, 2018

(54) CARBON NANOSTRUCTURE AND METHOD FOR PREPARING THE SAME

(71) Applicant: KOREA INSTITUTE OF SCIENCE AND TECHNOLOGY, Seoul (KR)

(72) Inventors: Han Ik Jo, Wanju-gun (KR); Gil Seong Kang, Wanju-gun (KR); Cheol-Ho Lee, Wanju-gun (KR); Sung Ho Lee, Wanju-gun (KR); Dong Su Lee, Wanju-gun (KR); Tae-Wook Kim, Wanju-gun (KR); Younki Lee, Wanju-gun (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/165,115

(22) Filed: May 26, 2016

(65) Prior Publication Data

US 2017/0058193 A1    Mar. 2, 2017

(30) Foreign Application Priority Data

Sep. 2, 2015 (KR) .................. 10-2015-0124462

(51) Int. Cl.
   *C09K 11/65*    (2006.01)
   *C09K 11/77*    (2006.01)
   *C09K 11/68*    (2006.01)
   *C09K 11/02*    (2006.01)
   (Continued)

(52) U.S. Cl.
   CPC .............. *C09K 11/65* (2013.01); *C01B 32/15* (2017.08); *C09K 11/68* (2013.01); *C09K 11/7756* (2013.01); *C09K 11/7759* (2013.01); *C09K 11/87* (2013.01); *C01P 2004/62* (2013.01); *C01P 2004/64* (2013.01)

(58) Field of Classification Search
   CPC ...... C98K 11/65; C98K 11/68; C98K 11/7756
   See application file for complete search history.

(56) References Cited

U.S. PATENT DOCUMENTS

| 7,192,477 | B2* | 3/2007 | Nakanishi ............ B01D 9/0054 106/412 |
| 9,637,443 | B2* | 5/2017 | Zhao ..................... H01L 29/127 |
| 2006/0073275 | A1 | 4/2006 | Maruyama et al. |

(Continued)

FOREIGN PATENT DOCUMENTS

| CN | 102190296 A | 9/2011 |
| CN | 103288069 A | 9/2013 |

(Continued)

OTHER PUBLICATIONS

Kim, Sung, et al. "Anomalous Behaviors of Visible Luminescence from Graphene Quantum Dots: Interplay Between Size and Shape." ACS nano 6.9 (2012): 8203-8208.

(Continued)

Primary Examiner — Alexandre F Ferre
(74) Attorney, Agent, or Firm — NSIP Law

(57) ABSTRACT

Provided is a carbon nanostructure including a plurality of organic molecules that are decomposition products of an organic solvent. The carbon nanostructure includes a carbon nanostructure core and a plurality of organic molecules bound to and grown on the carbon nanostructure core, wherein the carbon nanostructure core is a combination of the organic molecules.

9 Claims, 20 Drawing Sheets

(51) Int. Cl.
    *C09K 11/87*   (2006.01)
    *C01B 32/15*   (2017.01)

(56) References Cited

U.S. PATENT DOCUMENTS

2009/0155161 A1    6/2009  Yoon et al.
2012/0068154 A1*   3/2012  Hwang ................ H01L 51/502
                                                        257/13

FOREIGN PATENT DOCUMENTS

| JP | 2013-32258 A | 2/2013 |
| JP | 5146371 B2 | 2/2013 |
| KR | 10-2009-0009419 A | 1/2009 |
| KR | 10-2012-0039665 A | 4/2012 |
| WO | WO 2011/012874 A1 | 2/2011 |

OTHER PUBLICATIONS

Niu, Liyong, et al. "Salt-assisted direct exfoliation of graphite into high-quality, large-size, few-layer graphene sheets." Nanoscale 5.16 (2013): 7202-7208
Alexey Kharlamov et al., "New Method of Generation of Carbon Molecules and Clusters," *Open Journal of Synthesis Theory and Applications*, vol. 2, Jan. 2013, pp. 38-45.
Chunmei Tang et al., "Doping the transition metal atom Fe, Co, Ni into $C_{48}B_{12}$ fullerene for enhancing $H_2$ capture: A theoretical study," *International Journal of Hydrogen Energy*, vol. 39, 2014, pp. 12741-12748.

* cited by examiner

CARBON NANOSTRUCTURE AND METHOD FOR PREPARING THE SAME

CROSS-REFERENCE TO RELATED APPLICATION

This application claims priority to Korean Patent Application No. 10-2015-0124462, filed on Sep. 2, 2015, and all the benefits accruing therefrom under 35 U.S.C. § 119, the contents of which in its entirety are herein incorporated by reference.

BACKGROUND

1. Field

The present disclosure relates to a carbon nanostructure and a method for preparing the same. More particularly, the present disclosure relates to a carbon nanostructure obtained from decomposition products of an organic solvent and a method for preparing the same.

2. Description of the Related Art

The methods for preparing graphene quantum dots, one of the carbon nanostructures having a small size, may be classified into a top-down process including cleavage of a material having a larger size, such as graphite, and a bottom-up process including mixing carbon atom-containing organic materials.

First, graphite is a material in which graphene layers each having carbon atoms bound to each other in the form of a hexagonal cyclic structure are stacked. Herein, the carbon atoms forming graphene are bound through $sp^2$ bonding and one graphene layer is bound to the adjacent graphene layer through Van der Waals bonding. Thus, it is difficult to cleave graphite into quantum dots having a small size. Therefore, according to the related art, a top-down process is used to weaken the bonding between graphene planes and layers and to produce quantum dots. For this purpose, graphene oxide is produced and it is subjected to hydrothermal reaction, thereby providing quantum dots. However, since such a method causes chemical oxidation of graphite structure in a strong acidic solution, the resultant quantum dots have poor quality. In addition, such a method requires multiple processing steps to produce graphene quantum dots and each step causes a drop in yield.

Meanwhile, a bottom-up process for producing graphene quantum dots includes subjecting carbon atom-containing organic materials to thermal or chemical treatment to control the size and to prepare quantum dots. Typically, an organic material, such as citric acid or glucose, is used as carbon precursor and quantum dots are prepared under high temperature/high pressure. Herein, depending on the particular organic material used for the process, doping with a heteroatom is performed. The resultant quantum dots show high production yield and high quantum yield. Thus, there is an advantage in that the resultant quantum dots show more uniform characteristics as compared to the quantum dots obtained by cleaving graphite. However, since byproducts are produced during the production of quantum dots, a purification process is essentially required and the quantum dots, once produced, are dispersed in a solvent merely in a small amount.

Under these circumstances, there has been an imminent need for developing a carbon nanostructure obtained by a simple process without production of byproducts and having excellent characteristics, and a method for preparing the same.

REFERENCES

Patent Documents

CN102190296 A

SUMMARY

The present disclosure is directed to providing a carbon nanostructure obtained by a simple process without production of byproducts and having excellent characteristics, and a method for preparing the same.

The present disclosure is also directed to providing a carbon nanostructure obtained by using an organic solvent alone without introduction of any additional heteroatom or additional process, having a uniform size and high quality, and doped with a heteroatom, as well as a method for preparing the same.

In one aspect, there is provided a carbon nanostructure including a plurality of organic molecules that are decomposition products of an organic solvent.

According to an embodiment, the carbon nanostructure may include a carbon nanostructure core and a plurality of organic molecules bound to and grown on the carbon nanostructure core, wherein the carbon nanostructure core may be a combination of the organic molecules.

According to another embodiment, the carbon nanostructure may be a decomposition product of a carbon precursor and have a zero-dimensional, two-dimensional or three-dimensional structure, wherein the carbon precursor may be a combination of the organic molecules.

According to still another embodiment, the organic solvent may include at least one selected from the group consisting of acetone, benzene, N-methyl-2-pyrrolidone (NMP), dimethyl formamide (DMF), dimethyl sulfoxide (DMSO), n-hexane, benzene, carbon tetrachloride, liquid carbon dioxide and carbon disulfide.

According to still another embodiment, the organic solvent may further include liquid ammonia.

According to still another embodiment, the carbon nanostructure may be doped with a heteroatom.

According to still another embodiment, the heteroatom may be at least one selected from the group consisting of nitrogen (N), fluorine (F), oxygen (O), phosphorus (P), boron (B), sulfur (S), chlorine (Cl), bromine (Br) and iodine (I), other than carbon (C).

According to still another embodiment, the organic solvent may further include a metal or metal precursor, and the organic molecules may be metal-organic molecules formed through the binding of a decomposition product of the metal or metal precursor with a decomposition product of the organic solvent.

According to still another embodiment, the carbon nanostructure may include a metal-carbon nanostructure core and the metal-organic molecules bound to and grown on the metal-carbon nanostructure core, wherein the metal-carbon nanostructure core may be a combination of the metal-organic molecules.

According to still another embodiment, the carbon nanostructure may be a decomposition product of a metal-carbon precursor, wherein the metal-carbon precursor may be a combination of the metal-organic molecules.

According to still another embodiment, the metal may be at least one selected from the group consisting of platinum (Pt), ruthenium (Ru), copper (Cu), iron (Fe), nickel (Ni), cobalt (Co), palladium (Pd), tungsten (W), iridium (Ir), rhodium (Rh), strontium (Sr), cesium (Ce), praseodymium (Pr), neodymium (Nd), samarium (Sm), rhenium (Re), magnesium (Mg), boron (B) and aluminum (Al), and the metal precursor may be at least one selected from the group consisting of $CuCl_2$, $CoCl_2$, $OsCl_3$, $CrCl_3$, $(NH_3)_6RuCl_3$, $FeCl_3$, $NiCl_2$, $PdCl_2$, $RuCl_3$, $H_2PtCl_6$, $Pd(NO_3)_2$, $(NH_3)_4Pt(NO_3)_2$, $Fe(NO_3)_3$, $Ni(NO_3)_2$, iron acetlyacetonate, ferrocene and $Pt(acac)_2$.

According to yet another embodiment, the solvent may be NMP, and the organic molecule may be at least one selected from the group consisting of methyl 5-oxo-L-prolinate, 1-methyl-5-oxo-2-pyrrolidinyl)methyl acetate, (2S)-2-(Methoxymethyl)-1-pyrrolidinecarbaldehyde, 5-(hydroxymethyl)-1-methyl-2-pyrrolidinone, 5-(hydroxymethyl)-1-methyl-2-pyrrolidinone, (2E)-N-Hydroxy-4-methyl-3-penten-2-imine, 1-butylpyrrolidin-2-one, 1-methyl-2-pyrrolidinone, 1-ethyl-2-pyrrolidinyl)methanol, 1-(1-ethyl-2-pyrrolidinyl)methanamine, 1-[(2R)-1-ethyl-2-pyrrolidinyl]methanamine, (5E)-7-vinyl-5-undecene, (2E,9E)-2,9-undecadiene, N-ethyl-1-propanamine, N-methyl-N-nitro-1-(1-piperidinyl)methanamine, 3-(2-methyl-1-piperidinyl)-1-propanamine, 1,5-dimethyl-2-pyrrolidinone, (2S)-2-(methoxymethyl)-1-pyrrolidinecarbaldehyde, 1-(2-hydroxyethyl)-2-pyrrolidinone, 5-methyl-2-octyl-3(2H)-furanone, 3-hydroxy-3-phenylpropyl carbamate, 2-hydroxypropanoic acid, 4-penten-2-ol, N-(2-aminoethyl)acetamide, N-acetyl-N-methylacetamide, N-ethylformamide, 1-(3-hydroxypropyl)-2-pyrrolidinone and 1-ethyl-N-(2-formylphenyl)prolinamide.

In another aspect, there is provided a method for preparing a carbon nanostructure, including: introducing an organic solvent to a reaction container and applying temperature and pressure thereto to carry out decomposition of the organic solvent so that a plurality of organic molecules may be formed; combining the organic molecules with each other to form a carbon nanostructure core; and binding the organic molecules to the carbon nanostructure core and growing the core to form a carbon nanostructure.

In still another aspect, there is provided a method for preparing a carbon nanostructure, including: introducing an organic solvent to a reaction container and applying temperature and pressure thereto to carry out decomposition of the organic solvent so that a plurality of organic molecules may be formed; combining the organic molecules with each other to form a carbon precursor; and decomposing the carbon precursor to form a plurality of carbon nanostructures having a zero-dimensional, two-dimensional or three-dimensional structure.

According to an embodiment, when forming a plurality of the organic molecules, the temperature may be 40-800° C. and the pressure may be 1-500 atm.

According to still another embodiment, the organic solvent may include at least one selected from the group consisting of acetone, benzene, N-methyl-2-pyrrolidone (NMP), dimethyl formamide (DMF), dimethyl sulfoxide (DMSO), n-hexane, benzene, carbon tetrachloride, liquid carbon dioxide and carbon disulfide.

According to still another embodiment, when forming a plurality of organic molecules, the solvent may be NMP, and the organic molecule may be at least one selected from the group consisting of methyl 5-oxo-L-prolinate, 1-methyl-5-oxo-2-pyrrolidinyl)methyl acetate, (2S)-2-(Methoxymethyl)-1-pyrrolidinecarbaldehyde, 5-(hydroxymethyl)-1-methyl-2-pyrrolidinone, 5-(hydroxymethyl)-1-methyl-2-pyrrolidinone, (2E)-N-Hydroxy-4-methyl-3-penten-2-imine, 1-butylpyrrolidin-2-one, 1-methyl-2-pyrrolidinone, 1-ethyl-2-pyrrolidinyl)methanol, 1-(1-ethyl-2-pyrrolidinyl)methanamine, 1-[(2R)-1-ethyl-2-pyrrolidinyl]methanamine, (5E)-7-vinyl-5-undecene, (2E,9E)-2,9-undecadiene, N-ethyl-1-propanamine, N-methyl-N-nitro-1-(1-piperidinyl)methanamine, 3-(2-methyl-1-piperidinyl)-1-propanamine, 1,5-dimethyl-2-pyrrolidinone, (2S)-2-(methoxymethyl)-1-pyrrolidinecarbaldehyde, 1-(2-hydroxyethyl)-2-pyrrolidinone, 5-methyl-2-octyl-3(2H)-furanone, 3-hydroxy-3-phenylpropyl carbamate, 2-hydroxypropanoic acid, 4-penten-2-ol, N-(2-aminoethyl)acetamide, N-acetyl-N-methylacetamide, N-ethylformamide, 1-(3-hydroxypropyl)-2-pyrrolidinone and 1-ethyl-N-(2-formylphenyl)prolinamide.

According to still another embodiment, oxygen ($O_2$)-containing gas or chemical may be introduced to the reaction container as reaction accelerator.

According to still another embodiment, the yield of carbon nanostructures may be 5%-95%.

According to still another embodiment, the carbon nanostructures may be dispersed at a concentration of 0.001 mg/mL-10,000 mg/mL.

According to still another embodiment, the carbon nanostructures may be dispersed at a concentration of 10 mg/mL-200 mg/mL.

According to yet another embodiment, the carbon nanostructures may have a size of 0.1-10,000 nm.

The carbon nanostructure obtained by using an organic solvent according to an embodiment is formed to have a uniform size and shows high applicability, and thus may be used in various industrial fields. In addition, the carbon nanostructure may be dispersed in a solvent at high concentration for a long time, and thus shows high dispersibility.

In addition, the carbon nanostructure may be doped with various heteroatoms and show various characteristics depending on types of heteroatoms, and thus may be applied to various industrial fields.

The method for preparing a carbon nanostructure according to an embodiment produces a carbon nanostructure having a uniform size by using an organic solvent under application of thermal energy, while the carbon nanostructure is doped with a heteroatom. Therefore, according to the method, it is possible to dope the carbon nanostructure with heteroatoms contained in a solvent through simple solvent exchange, and thus to provide carbon nanostructures doped with heteroatoms having various characteristics.

In addition, since the carbon nanostructure is obtained by using an organic solvent alone, it is possible to inhibit side reactions so that carbon nanostructure may have high quality without any purification process.

Further, the solvent remaining after forming the carbon nanostructure may be reused through extraction. Thus, it is possible to carry out an eco-friendly process while not generating waste materials.

DETAILED DESCRIPTION

Figure 1:
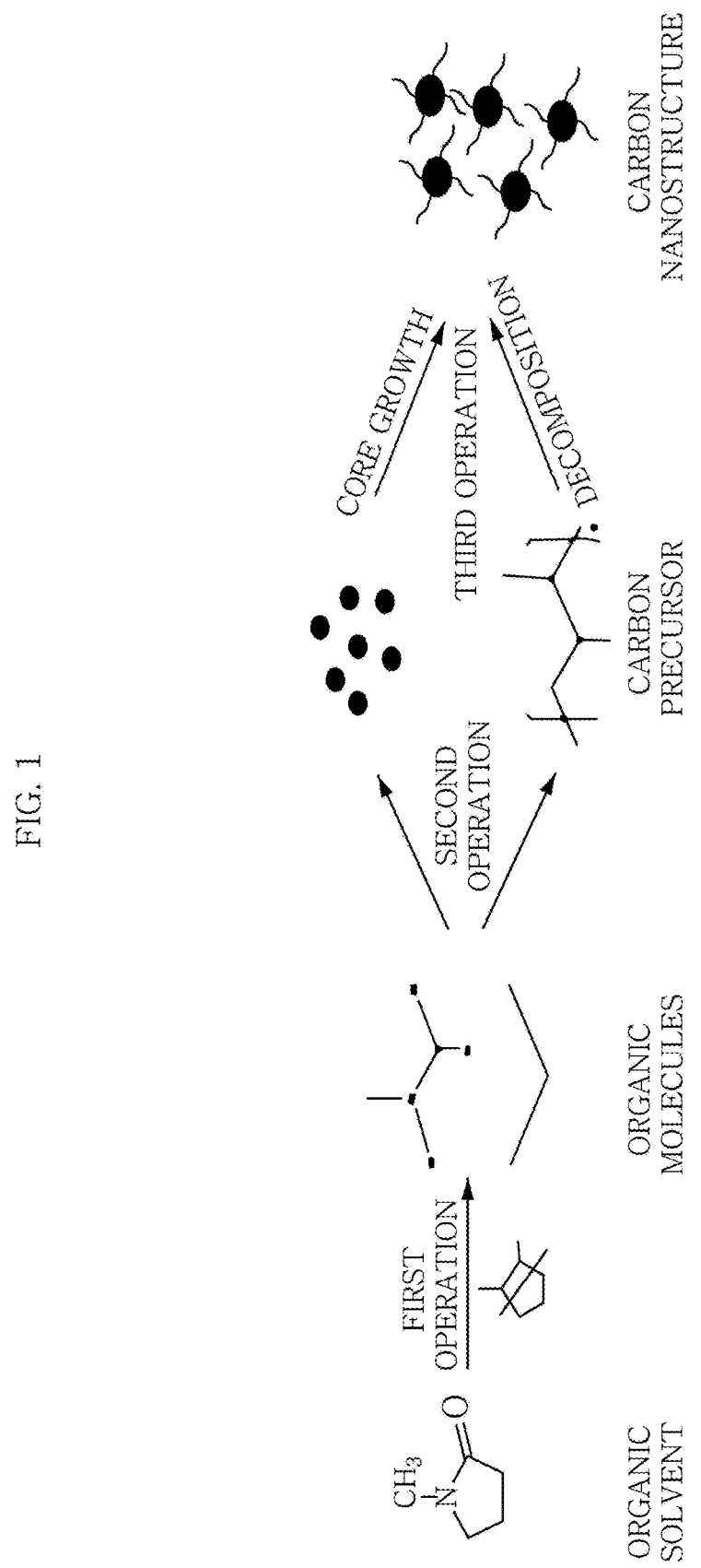
FIG. 1 is a schematic view illustrating the method for preparing a carbon nanostructure according to an embodiment.

As used herein, the term 'organic solvent' means a solvent including carbon atom-containing molecules.

As used herein, the term 'organic molecules' means molecules formed by decomposition of an organic solvent and containing carbon (C) atoms.

As used herein, the term 'carbon precursor' means a material formed by combination of a plurality of organic molecules and having a larger particle shape or molecular weight.

As used herein, the term 'carbon nanostructure core' means a core formed by combining a plurality of the organic molecules with each other.

As used herein, the term 'carbon nanostructure' means a material formed by growth of the organic molecules on the carbon nanostructure core or the decomposition product of the carbon precursor.

As used herein, the expression 'having a zero-dimensional structure' means having a microparticle structure, the expression 'having a two-dimensional structure' means having a structure in which 10 or less of planar sheets are stacked, and the expression 'having a three-dimensional structure' means having a structure in which 10 or more layers of the material having the two-dimensional structure are stacked. For example, in terms of a carbonaceous material, it is said that fullerene has a zero-dimensional structure, graphene has a two-dimensional structure, and graphite has a three-dimensional structure.

As used herein, the term 'metal-organic molecules' means a material formed by combination of a plurality of organic molecules with a metal and/or metal precursor bound to the organic molecules.

As used herein, the term 'metal-carbon nanostructure core' means a core formed by combination of a plurality of the metal-organic molecules.

As used herein, the term 'metal-carbon precursor' means a material formed by combination of a plurality of metal-organic molecules and having a large particle shape or molecular weight.

As used herein, the term 'metal-carbon nanostructure' means a product formed by growth of the metal-organic molecules on the metal-carbon nanostructure core.

As used herein, the term 'carbonaceous material' means a material including carbon, such as graphite, carbon nanotubes, or the like.

As used herein, the term 'nano' means a size within a range of 0.01-10,000 nm.

As used herein, the term 'heteroatom' means an element, such as nitrogen (N), fluorine (F), oxygen (O), phosphorus (P), boron (B), sulfur (S), chlorine (Cl), bromine (Br) or iodine (I), other than carbon (C).

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein.

Method for Preparing Carbon Nanostructure

In one aspect, there is provided a method for preparing a carbon nanostructure, including: introducing an organic solvent to a reaction container and applying temperature and pressure thereto to decompose the organic solvent so that a plurality of organic molecules may be formed; and carrying out growth of the core of a plurality of the organic molecules in the carbon nanostructure core formed by decomposition of the organic solvent to form a carbon nanostructure.

Each operation will be explained hereinafter.

FIG. 1 is a schematic view illustrating the method for preparing a carbon nanostructure according to an embodiment.

Referring to the upper part of FIG. 1, only the organic solvent is introduced to the reaction container and temperature and pressure are applied thereto to decompose the organic solvent molecules and to form a plurality of organic molecules (the first operation).

Particularly, as shown in FIG. 1, it is possible to form a plurality of organic molecules by decomposing the organic solvent molecules. Herein, when the organic solvent molecules have a cyclic structure, the cyclic structure may be deformed in such a manner that it is opened or has a smaller molecular structure, thereby forming organic molecules having a structure different from the structure of the organic solvent molecules.

Although FIG. 1 shows forming one type of organic molecules, the present disclosure is not limited thereto, and it is possible to form a plurality of organic molecules having various types, as long as the molecules may be produced by decomposition of the organic solvent.

According to an embodiment, the organic solvent may include at least one selected from the group consisting of polar solvents and non-polar solvents. Particularly, the organic solvent may include at least one selected from the group consisting of polar solvents, such as acetone, benzene, N-methyl-2-pyrrolidone (NMP), dimethylformamide (DMF) and dimethyl sulfoxide (DMSO). In addition to such solvents, the organic solvent may include at least one selected from the group consisting of non-polar solvents, such as n-hexane, benzene, carbon tetrachloride, liquid carbon dioxide and carbon disulfide. The organic solvent may further include an inorganic solvent, such as liquid ammonia.

According to another embodiment, since the organic molecules may be formed not only by simple decomposition of the organic solvent but also by the combination of the decomposition products of the organic solvent molecules, various types of organic molecules may be formed.

For example, when the organic solvent is NMP, particular example of the organic molecules may include methyl 5-oxo-L-prolinate, 1-methyl-5-oxo-2-pyrrolidinyl)methyl acetate, (2S)-2-(Methoxymethyl)-1-pyrrolidinecarbaldehyde, 5-(hydroxymethyl)-1-methyl-2-pyrrolidinone, 5-(hydroxymethyl)-1-methyl-2-pyrrolidinone, (2E)-N-Hydroxy-4-methyl-3-penten-2-imine, 1-butylpyrrolidin-2-one, 1-methyl-2-pyrrolidinone, 1-ethyl-2-pyrrolidinyl)methanol, 1-(1-ethyl-2-pyrrolidinyl)methanamine, 1-[(2R)-1-ethyl-2-pyrrolidinyl]methanamine, (5E)-7-vinyl-5-undecene, (2E,9E)-2,9-undecadiene, N-ethyl-1-propanamine, N-methyl-N-nitro-1-(1-piperidinyl)methanamine, 3-(2-methyl-1-piperidinyl)-1-propanamine, 1,5-dimethyl-2-pyrrolidinone, (2S)-2-(methoxymethyl)-1-pyrrolidinecarbaldehyde, 1-(2-hydroxyethyl)-2-pyrrolidinone, 5-methyl-2-octyl-3(2H)-furanone, 3-hydroxy-3-phenylpropyl carbamate, 2-hydroxypropanoic acid, 4-penten-2-ol, N-(2-aminoethyl)acetamide, N-acetyl-N-methylacetamide, N-ethylformamide, 1-(3-hydroxypropyl)-2-pyrrolidinone and 1-ethyl-N-(2-formylphenyl)prolinamide.

According to still another embodiment, different types of organic molecules may be formed depending on various conditions, such as reaction time, temperature and pressure of the first operation, amounts of the chemicals, or the like.

For example, when the organic solvent is NMP, products of organic molecules depending on reaction time of the first operation are as follows.

When the reaction time of the first operation by which NMP is decomposed is about 2-12 hours, organic molecules that may be formed include methyl 5-oxo-L-prolinate, 1-methyl-5-oxo-2-pyrrolidinyl)methyl acetate, (2S)-2-(Methoxymethyl)-1-pyrrolidinecarbaldehyde, 5-(hydroxymethyl)-1-methyl-2-pyrrolidinone, 5-(hydroxymethyl)-1-methyl-2-pyrrolidinone, (2E)-N-Hydroxy-4-methyl-3-penten-2-imine, 1-butylpyrrolidin-2-one, 1-methyl-2-pyrrolidinone, 1-ethyl-2-pyrrolidinyl)methanol, 1-(1-ethyl-2-pyrrolidinyl)methanamine, 1-[(2R)-1-ethyl-2-pyrrolidinyl]methanamine, (5E)-7-vinyl-5-undecene, (2E,9E)-2,9-undecadiene, N-ethyl-1-propanamine, or the like. When the reaction time of the first operation by which NMP is decomposed is about 18 hours, organic molecules that may be formed include N-methyl-N-nitro-1-(1-piperidinyl)methanamine, 3-(2-methyl-1-piperidinyl)-1-propanamine, 1,5-dimethyl-2-pyrrolidinone, (2S)-2-(methoxymethyl)-1-pyrrolidinecarbaldehyde, 1-(2-hydroxyethyl)-2-pyrrolidinone, 5-methyl-2-octyl-3(2H)-furanone, 3-hydroxy-3-phenylpropyl carbamate, 2-hydroxypropanoic acid, 4-penten-2-ol, or the like. When the reaction time of the first operation by which NMP is decomposed is about 36 hours, organic molecules that may be formed include N-(2-aminoethyl)acetamide, N-acetyl-N-methylacetamide, N-ethylformamide, 1-(3-hydroxypropyl)-2-pyrrolidinone, or the like. In addition, When the reaction time of the first operation by which NMP is decomposed is about 48 hours, organic molecules that may be formed include 1-ethyl-N-(2-formylphenyl)prolinamide, or the like.

According to still another embodiment, while the organic molecules are formed, the organic molecules may be doped with the heteroatom of the organic solvent.

According to still another embodiment, the organic molecules may be doped with at least one heteroatom selected from the group consisting of nitrogen (N), fluorine (F), oxygen (O), phosphorus (P), boron (B), sulfur (S), chlorine (Cl), bromine (Br) and iodine (I).

According to still another embodiment, the operation of forming the organic molecules may be carried out under the conditions of pressure and temperature equal to or higher than the vaporization point of the organic solvent. The temperature and pressure conditions of the first operation may be varied depending on particular type of the solvent.

In general, the first operation may be carried out at a temperature of 40-800° C. under a pressure of 1-500 atm. In addition, for example, when using ethanol as solvent, the first operation may be carried out at a temperature of 300° C. or higher and a pressure of 20 atm or higher.

In a variant, in the case of some solvents, it is possible to form organic molecules merely by controlling temperature under ambient pressure.

In addition, during the first operation, it is possible to add a chemical or gas containing oxygen ($O_2$) into the reaction container as reaction accelerator. Further, the oxygen-containing chemical or gas may be introduced continuously into the reaction container until the carbon nanostructure is formed as described hereinafter.

Then, a carbon nanostructure core is formed by combination of a plurality of the organic molecules (the second operation).

According to an embodiment, when applying a predetermined level of heat and pressure is applied to a plurality of the organic molecules, the radicals of the organic molecules react with each other to form microparticles. Then, the reaction proceeds continuously so that the size and concentration of microparticles may be increased to form a core capable of forming a carbon nanostructure. Hereinafter, such a core capable of forming a carbon nanostructure is referred to as a carbon nanostructure core.

According to another embodiment, the second operation may be carried out under different temperature and pressure conditions depending on type of the solvent. For example, the second operation may be carried out at a temperature of 40-800° C. under a pressure of 1-500 atm.

In a variant, in the case of some solvents, it is possible to form a carbon nanostructure core merely by controlling temperature under ambient pressure.

According to still another embodiment, the organic molecules may be doped with a heteroatom, and thus the carbon nanostructure core may be formed to have a heteroatom.

Meanwhile, a plurality of organic molecules does not participate in the reaction when the carbon nanostructure core is formed but remains as they are.

According to still another embodiment, a plurality of carbon nanostructure cores may be formed.

Then, a plurality of the organic molecules undergoes core growth about the carbon nanostructure so that a carbon nanostructure including the carbon nanostructure core and a plurality of the organic molecules bound to the carbon nanostructure core may be formed (the third operation).

Particularly, such a carbon nanostructure may be formed at a temperature of 40-800° C. under a pressure of 1-500 atm by using the temperature and pressure. In the second operation, it is possible to form a plurality of carbon nanostructure cores, and thus to form a plurality of carbon nanostructures.

In a variant, in the case of some solvents, it is possible to form a plurality of carbon nanostructures merely by controlling temperature under ambient pressure.

According to an embodiment, the carbon nanostructure core may be formed to have a heteroatom doped thereto, and thus the carbon nanostructure may be formed to have a heteroatom doped thereto.

According to another embodiment, the carbon nanostructure may be obtained with a yield of about 5-95%.

Herein, the carbon nanostructure may have a size of about 0.1-10,000 nm, a thickness of about 0.1-200 nm and an area of about $1\text{-}10^5$ $nm^2$.

In another aspect, there is provided a method for preparing a carbon nanostructure, including: introducing an organic solvent to a reaction container and applying temperature and pressure thereto to decompose the organic solvent so that a plurality of organic molecules may be formed; forming a carbon precursor through combination of a plurality of the organic molecules; and carrying out decomposition of the carbon precursor to form a plurality of carbon nanostructures. In this method, the operation of forming a plurality of organic molecules by decomposing an organic solvent is the same as or similar to the aspect described hereinbefore, and thus detailed description thereof will be omitted.

Hereinafter, each operation will be explained.

Referring to the lower part of FIG. 1, only the organic solvent is introduced to the reaction container and is decomposed to form a plurality of organic molecules (the first operation).

Particularly, as shown in FIG. 1, it is possible to form a plurality of organic molecules by decomposition the organic solvent molecules. Herein, when the organic solvent molecules have a cyclic structure, the cyclic structure may be deformed in such a manner that it is opened or has a smaller molecular structure, thereby forming organic molecules having a structure different from the organic solvent molecules.

In addition, during the first operation, it is possible to control the reactivity by additionally adding oxygen-containing chemical or gas into the reaction container. Further, the oxygen-containing chemical or gas may be introduced continuously into the reaction container until the carbon nanostructure is formed as described hereinafter.

Then, a carbon precursor is formed by combination of a plurality of the organic molecules (the second operation).

Particularly, when applying a predetermined level of heat and pressure is applied, a plurality of the organic molecules combines randomly to form a carbon precursor having a large molecular weight.

According to an embodiment, the carbon precursor may have a molecular weight of 200 MW or more, particularly a molecular weight of 200 MW-1,000,000 MW.

According to another embodiment, the carbon precursor may have a chain structure.

According to another embodiment, the second operation may be carried out under different temperature and pressure conditions depending on type of the solvent. For example, the second operation may be carried out at a temperature of 40-800° C. under a pressure of 1-500 atm.

In a variant, in the case of some solvents, it is possible to form a carbon precursor merely by controlling temperature under ambient pressure.

According to still another embodiment, the organic molecules may be doped with a heteroatom, and thus the carbon precursor may be formed to have a heteroatom.

Then, the carbon precursor is decomposed to form a plurality of carbon nanostructures (the third operation).

Particularly, it is possible to form a plurality of carbon nanostructures at a temperature of 40-800° C. under a pressure of 1-500 atm by using the temperature and pressure.

According to still another embodiment, the carbon nanostructure may have a zero-dimensional, two-dimensional or three-dimensional structure. Meanwhile, the carbon nanostructure may have a circular or oval structure.

As described above, although the carbon nanostructure may be formed under application of heat and pressure, it is possible to form a plurality of carbon nanostructures merely by controlling temperature under ambient pressure, in the case of some solvents.

According to still another embodiment, the carbon precursor may be formed to have a heteroatom doped thereto, and thus the carbon nanostructure as a decomposition product of the carbon precursor may be formed to have a heteroatom doped thereto.

According to yet another embodiment, the carbon nanostructure may be obtained with a yield of about 5-95%. In addition, the carbon nanostructure may have a size of about 0.1-10,000 nm, a thickness of about 0.1-200 nm and an area of about $1\text{-}10^5$ $nm^2$.

Carbon Nanostructure

In still another aspect, there is provided a carbon nanostructure including a plurality of organic molecules that are the decomposition products of an organic solvent.

According to an embodiment, the carbon nanostructure includes a carbon nanostructure core and a plurality of organic molecules bound to and grown on the carbon nanostructure core, wherein the carbon nanostructure core may be a combination of the organic molecules.

According to another embodiment, the organic solvent may include at least one selected from the group consisting of polar solvents and non-polar solvents. Particularly, the organic solvent may include at least one selected from the group consisting of polar solvents, such as acetone, benzene, N-methyl-2-pyrrolidone (NMP), dimethylformamide (DMF) and dimethyl sulfoxide (DMSO). In addition to such solvents, the organic solvent may include at least one selected from the group consisting of non-polar solvents, such as n-hexane, benzene, carbon tetrachloride, liquid carbon dioxide and carbon disulfide. The organic solvent may further include an inorganic solvent, such as liquid ammonia.

For example, when the organic solvent is NMP, particular example of the organic molecules may include methyl 5-oxo-L-prolinate, 1-methyl-5-oxo-2-pyrrolidinyl)methyl acetate, (2S)-2-(Methoxymethyl)-1-pyrrolidinecarbaldehyde, 5-(hydroxymethyl)-1-methyl-2-pyrrolidinone, 5-(hydroxymethyl)-1-methyl-2-pyrrolidinone, (2E)-N-Hydroxy-4-methyl-3-penten-2-imine, 1-butylpyrrolidin-2-one, 1-methyl-2-pyrrolidinone, 1-ethyl-2-pyrrolidinyl)methanol, 1-(1-ethyl-2-pyrrolidinyl)methanamine, 1-[(2R)-1-ethyl-2-pyrrolidinyl]methanamine, (5E)-7-vinyl-5-undecene, (2E, 9E)-2,9-undecadiene, N-ethyl-1-propanamine, N-methyl-N-nitro-1-(1-piperidinyl)methanamine, 3-(2-methyl-1-piperidinyl)-1-propanamine, 1,5-dimethyl-2-pyrrolidinone, (2S)-2-(methoxymethyl)-1-pyrrolidinecarbaldehyde, 1-(2-hydroxyethyl)-2-pyrrolidinone, 5-methyl-2-octyl-3(2H)-furanone, 3-hydroxy-3-phenylpropyl carbamate, 2-hydroxypropanoic acid, 4-penten-2-ol, N-(2-aminoethyl)acetamide, N-acetyl-N-methylacetamide, N-ethylformamide, 1-(3-hydroxypropyl)-2-pyrrolidinone and 1-ethyl-N-(2-formylphenyl)prolinamide.

According to still another embodiment, the organic molecule may include at least one heteroatom selected from the group consisting of nitrogen, oxygen, sulfur and chlorine or may be doped with the heteroatom. Therefore, the carbon nanostructure obtained by using the organic molecules may be doped with the heteroatom.

According to still another embodiment, a predetermined level of temperature and pressure is applied to the organic molecules so that the organic molecules may combine with each other to form a carbon nanostructure core.

In addition, since the organic molecules may have different types, it is possible to form various types of carbon nanostructure cores. Further, a plurality of such organic molecules reacts with each other to form a plurality of carbon nanostructure cores, which may have different structures.

In this case, the carbon nanostructure may be a product obtained by binding a plurality of the organic molecules to the carbon nanostructure core and carrying out core growth. In other words, the organic molecules may be bound continuously to the carbon nanostructure core to form a plurality of carbon nanostructures having a uniform size.

In still another aspect, there is provided a carbon nanostructure that is a decomposition product of a carbon precursor and has a zero-dimensional, two-dimensional or three-dimensional structure. Herein, the carbon precursor may be a combination of the organic molecules.

Meanwhile, the carbon precursor may be a high-molecular weight product obtained by random binding of the organic molecules.

According to an embodiment, the carbon precursor may have a molecular weight of 200 MW or more, particularly a molecular weight between 200 MW and 1,000,000 MW.

In this case, the carbon nanostructure may be a decomposition product of the carbon precursor. The carbon precursor may be decomposed into a plurality of carbon nanostructures having a uniform size during the decomposition of the carbon precursor. Therefore, a plurality of carbon nanostructures may be decomposed to have a uniform size.

According to another embodiment, the carbon nanostructure may have a size of about 0.1-10,000 nm. More specifically, the carbon nanostructure may have a size of 100 nm or less. In addition, the carbon nanostructure having a uniform size may be applied to various industrial fields, including airplane, machines, luminescent materials, anticalcinogenic agent, harmful chemical-removing agent, adsorbent, or the like.

According to still another embodiment, the carbon nanostructure may be dispersed at a concentration of 0.001 mg/mL-10,000 mg/mL and may show high dispersibility. More specifically, the carbon nanostructure may be dispersed at a concentration of 10 mg/mL-200 mg/mL.

Particularly, when the carbon nanostructure is added to a solvent in an amount of 50 parts by weight based on the total weight of the solvent, it may be dispersed into various solvents, such as polar organic solvents, non-polar organic solvents or inorganic solvent, for at least 1 month. Thus, the carbon nanostructure may be used as filler for various types of electronic devices and composite materials.

For example, when the organic solvent is NMP, the carbon nanostructure obtained by using the same solvent may be dispersed in NMO, water and ethanol with ease.

In addition, the carbon nanostructure may be produced in such a manner that it has various characteristics depending on solvent to be decomposed.

Particularly, when the solvent is benzene, a carbon nanostructure having high crystallinity may be formed. When the solvent is NMP, a carbon nanostructure doped with nitrogen, oxygen, etc. may be formed. In addition, when the solvent is DMSO, a sulfur-doped carbon nanostructure may be formed. Therefore, the carbon nanostructure may be used as a transparent electrode, electrode for an organic light emitting device (OLED) or organic photovoltaic cell (OPV), or an electrode for a semiconductor material, fuel cell, battery or super capacitor. Further, the carbon nanostructure may be used for various industrial fields, including luminescence materials, agents for removing harmful chemicals, such as calcinogens, adsorbents, fillers for composite materials, or the like.

In addition, the carbon nanostructure may show various characteristics depending on type of heteroatom doped thereto, and thus may be applied to various industrial fields.

Further, the carbon nanostructure produced from the organic solvent may be dispersed in a solvent at high concentration for a long time, and thus shows high dispersibility. In addition, the carbon nanostructure may be reused for different solvents. Thus, when the carbon nanostructure dispersed in solution is dried completely into powder and then dispersed into a different solvent, it may show high dispersibility.

Metal-Carbon Nanostructure and Method for Preparing Metal-Carbon Nanostructure

The method for preparing a metal-carbon nanostructure is the same as or similar to the above-described method for preparing a carbon nanostructure. Thus, description of the same constitutional elements will be omitted hereinafter.

First, an organic solvent and a metal or metal precursor are introduced to a reaction container and temperature and pressure are applied thereto to decompose the organic solvent molecules in the organic solvent and the metal or metal precursor dissolved in the organic solvent, thereby forming a metal-organic molecule (the first operation).

According to an embodiment, a reductive gas or reducing agent may be further introduced in order to increase the binding force between the metal or metal precursor and the organic molecule.

According to another embodiment, when decomposing the metal or metal precursor dissolved in the organic solvent, oxygen ($O_2$)-containing chemical may be introduced as reaction accelerator capable of improving the reactivity, wherein the chemical may have a gaseous phase.

According to still another embodiment, the metal or metal precursor may be dissolved in the organic solvent in the form of ion.

According to still another embodiment, the metal may be at least one transition metal selected from the group consisting of platinum (Pt), ruthenium (Ru), copper (Cu), iron (Fe), nickel (Ni), cobalt (Co), palladium (Pd), tungsten (W), iridium (Ir), rhodium (Rh), strontium (Sr), cesium (Ce), praseodymium (Pr), neodymium (Nd), samarium (Sm) and rhenium (Re), or alloy including at least one of such metals. In a variant, the metal may be at least one non-transition metal selected from the group consisting of magnesium (Mg), boron (B) and aluminum (Al), or alloy including at least one of such metals.

According to still another embodiment, the metal precursor may be at least one selected from the group consisting of metal chlorides, metal nitrides, iron acetylacetonate and ferrocene. For example, the metal chlorides may include $CuCl_2$, $CoCl_2$, $OsCl_3$, $CrCl_3$, $(NH_3)_6RuCl_3$, $FeCl_3$, $NiCl_2$, $PdCl_2$, $RuCl_3$, $H_2PtCl_6$, or the like. The metal nitrides may include $Pd(NO_3)_2$, $(NH_3)_4Pt(NO_3)_2$, $Fe(NO_3)_3$, $Ni(NO_3)_2$, or the like.

According to still another embodiment, when the metal or metal precursor and the organic solvent are decomposed during the first operation, the organic solvent molecules in the organic solvent are positively (+) charged and the decomposition product of the metal or metal precursor dissolved in the organic solvent is negatively (−) charged. In other words, the decomposition product of the metal or metal precursor and that of the organic solvent molecules have a polarity different from each other. Therefore, the decomposition product of the metal or metal precursor and that of the organic solvent molecules may be bound to each other to form a combination. Hereinafter, the combination formed by binding of the decomposition product of the metal or metal precursor with that of the organic solvent molecules is referred to as a metal-organic molecule.

In addition, the organic solvent molecules may be decomposed alone during the first operation to form organic molecules not bound to the metal or metal precursor.

Meanwhile, during the first operation, oxygen ($O_2$)-containing gas or chemical may be added continuously to the reaction container as reaction accelerator. Further, the oxygen-containing chemical or gas may be introduced continuously into the reaction container until the carbon nanostructure is formed as described hereinafter.

Then, a metal-carbon nanostructure core and/or a metal-carbon precursor are formed by using the metal-organic molecule (the second operation).

According to an embodiment, when applying a predetermined level of heat and pressure is applied to a plurality of the organic molecules, the radicals of the metal-organic molecules react with each other to form microparticles. Then, the reaction proceeds continuously so that the size and concentration of microparticles may be increased to form a metal-carbon nanostructure core capable of forming a carbon nanostructure.

Meanwhile, such metal-organic molecules and/or organic molecules may be bound to each other randomly to form a metal-carbon precursor having a large molecular weight.

According to another embodiment, in this operation, the temperature and pressure conditions may be varied depending on type of solvent. However, in general, the second operation may be carried out at a temperature of 40-800° C. under a pressure of 1-500 atm. In a variant, in the case of some solvents, it is possible to form a metal-carbon nanostructure core and/or metal-carbon precursor merely by controlling temperature under ambient pressure.

In addition, during this operation, a carbon nanostructure core and/or carbon precursor containing no metal or metal precursor may be formed.

Then, a plurality of the metal-organic molecules may be grown about the metal-carbon nanostructure core or the metal-carbon precursor may be decomposed to form a plurality of metal-carbon nanostructures.

Therefore, it is possible to form a material including a plurality of metal-carbon nanostructures and carbon nanostructures.

The metal-carbon nanostructure obtained by the above-described method has all of the properties of the above-described carbon nanostructure, while showing metallic characteristics. Thus, the metal-carbon nanostructure shows various characteristics and may be used for various industrial fields.

While the exemplary embodiments have been shown and described, it will be understood by those skilled in the art that the scope of the present disclosure is not limited to the exemplary embodiments. The scope of the present disclosure is defined by the appended claims and many modifications can be made to adapt a particular situation or material to the teachings of the present disclosure without departing from the essential scope thereof. Therefore, it is intended that the present disclosure will include all embodiments falling within the scope of the appended claims.

Example 1

NMP is used as organic solvent to form a carbon precursor. NMP is taken in an amount of about 70 mL, introduced to a reactor capable of compression and heating, and heated to about 300° C. Herein, the pressure of the reactor increases to about 100 atm. Under the temperature and pressure condition, reaction is carried out for about 24 hours to decompose NMP so that a plurality of organic molecules may be formed. Then, a plurality of carbon nanostructures is prepared from the organic molecules.

Examples 2 to 5

Example 1 is repeated to provide the carbon nanostructures according to Examples 2 to 5, except that the heating is carried out to a different temperature of 140° C., 170° C., 200° C. or 250° C.

Example 6

NMP is used as organic solvent to form a carbon precursor. NMP is taken in an amount of about 70 mL, introduced to a reactor capable of compression and heating, and heated to about 170° C. under ambient pressure. In this manner, a plurality of organic molecules is formed, and then a plurality of carbon nanostructures is prepared from the organic molecules.

Example 7

Example 6 is repeated to provide carbon nanostructures, except that oxygen-containing gas is introduced continuously to the reactor during the reaction.

Comparative Example 1

Example 6 is repeated to provide carbon nanostructures, except that ethanol is used as organic solvent instead of NMP.

Test Example 1: Determination of Preparation of Carbon Nanostructures

Figure 2:
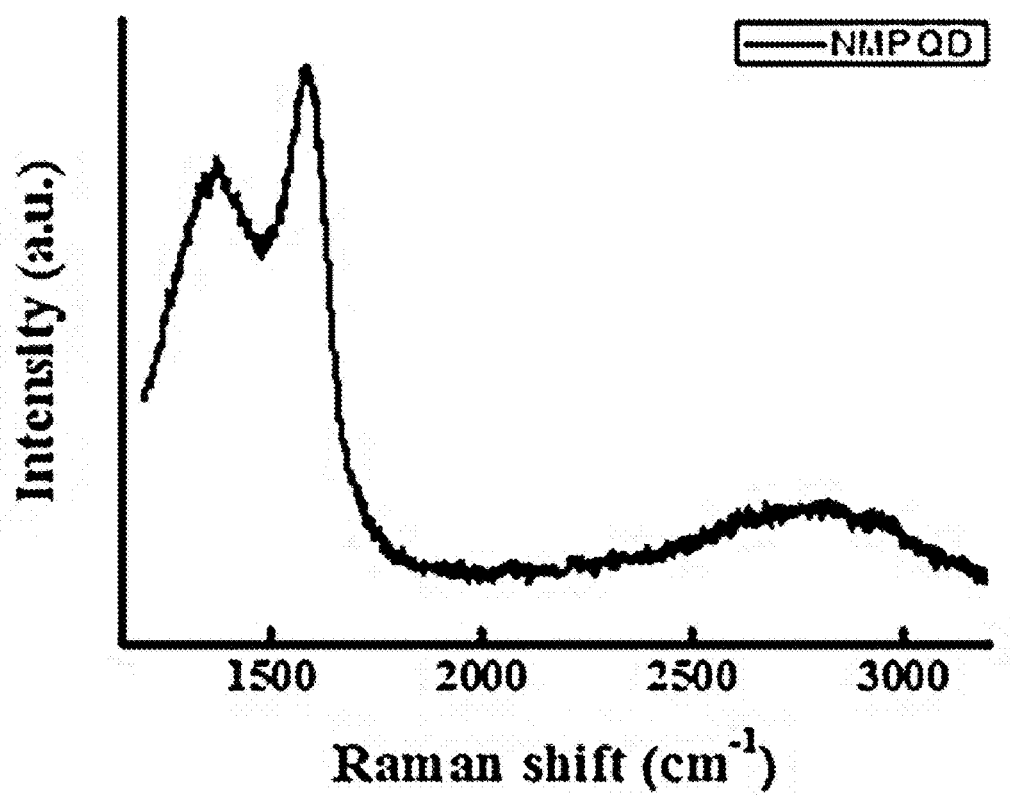
FIG. 2 is a graph illustrating the Raman spectrum of the carbon nanostructure according to an embodiment.

The solution containing the carbon nanostructure obtained according to Example 1 dispersed therein and the powder obtained by evaporation of the solution are analyzed, and the results are shown in FIG. 2. FIG. 2 is a graph illustrating the Raman spectrum of the carbon nanostructure according to an embodiment, FIG. 3 is a graph illustrating the photoluminescence (PL) spectrum of the carbon nanostructure according to an embodiment, and FIG. 4 is a photograph illustrating the image of the carbon nanostructure according to an embodiment, taken by transmission electron microscopy (TEM).

Figure 3:
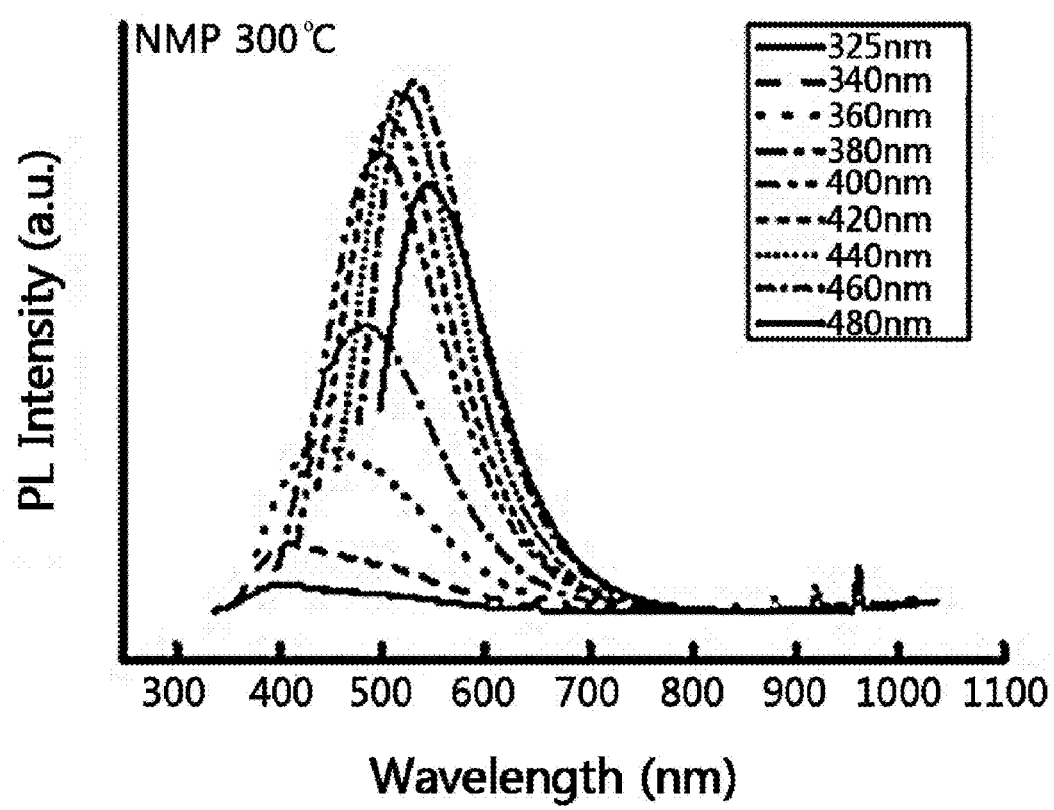
FIG. 3 is a graph illustrating the photoluminescence (PL) spectrum of the carbon nanostructure according to an embodiment.
Figure 4:
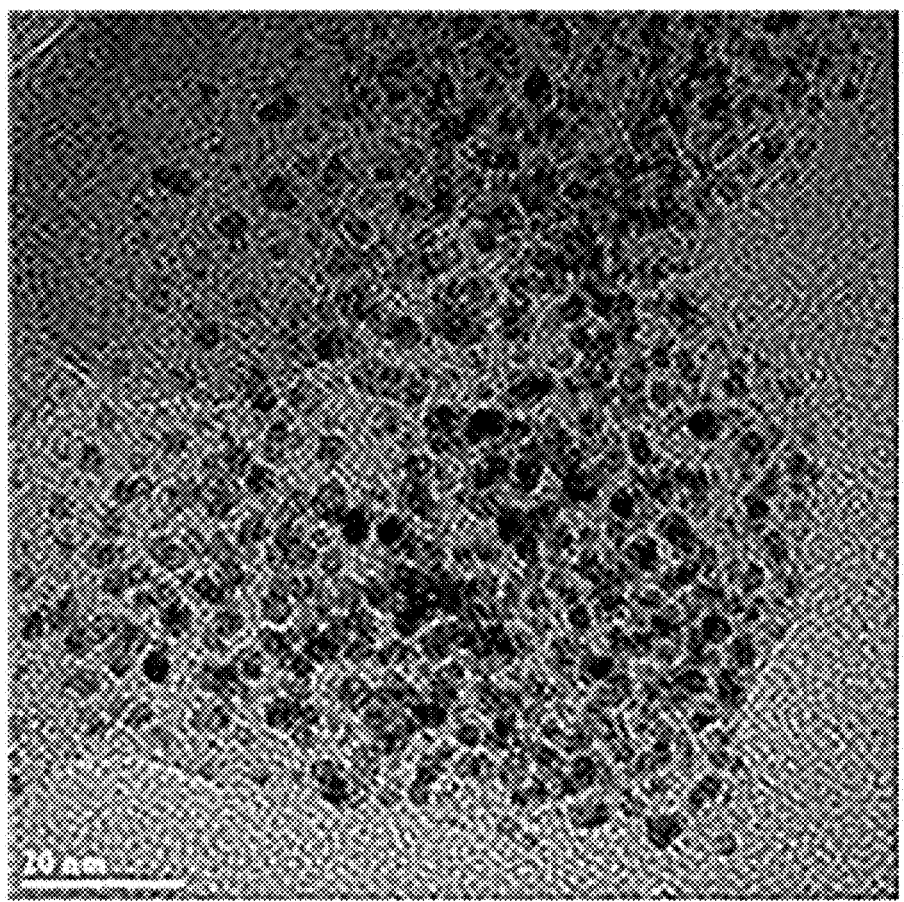
FIG. 4 is a photograph illustrating the image of the carbon nanostructure according to an embodiment, taken by transmission electron microscopy (TEM).

Referring to FIG. 2 to FIG. 4, the carbon nanostructures are prepared through the decomposition of the organic solvent. It can be seen that the carbon nanostructures have a graphene-like structure having a hexagonal cycle formed by carbon atoms. As shown in FIG. 4, the carbon nanostructures have a uniform size. In addition, referring to FIG. 3, when the solvent in which the carbon nanostructures are dispersed is irradiated with laser having a wavelength of 320 nm, blue- and sky blue-colored light having a wavelength of about 450 nm is emitted, which demonstrates that the carbon nanostructure according to Example 1 has light emission characteristics.

Test Example 2: Determination of Composition of Carbon Nanostructures

Figure 5A:
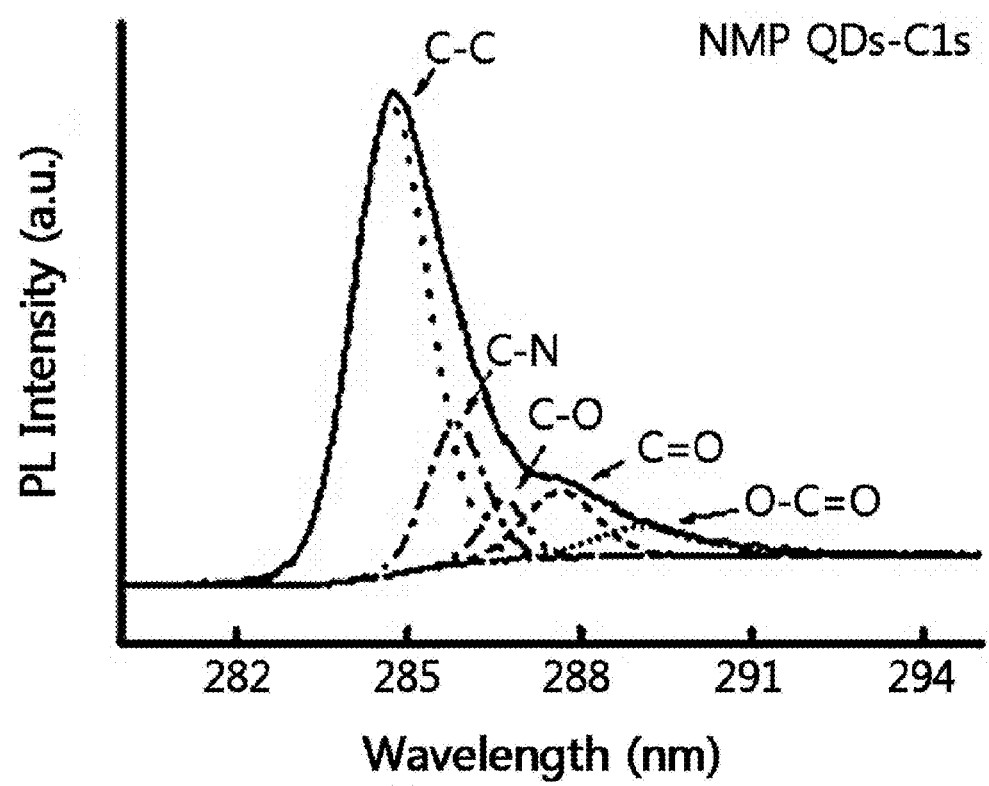
FIGS. 5A and 5B are graphs illustrating the X-ray photoelectron spectroscopy (XPS) of the carbon nanostructure according to an embodiment.
Figure 5B:
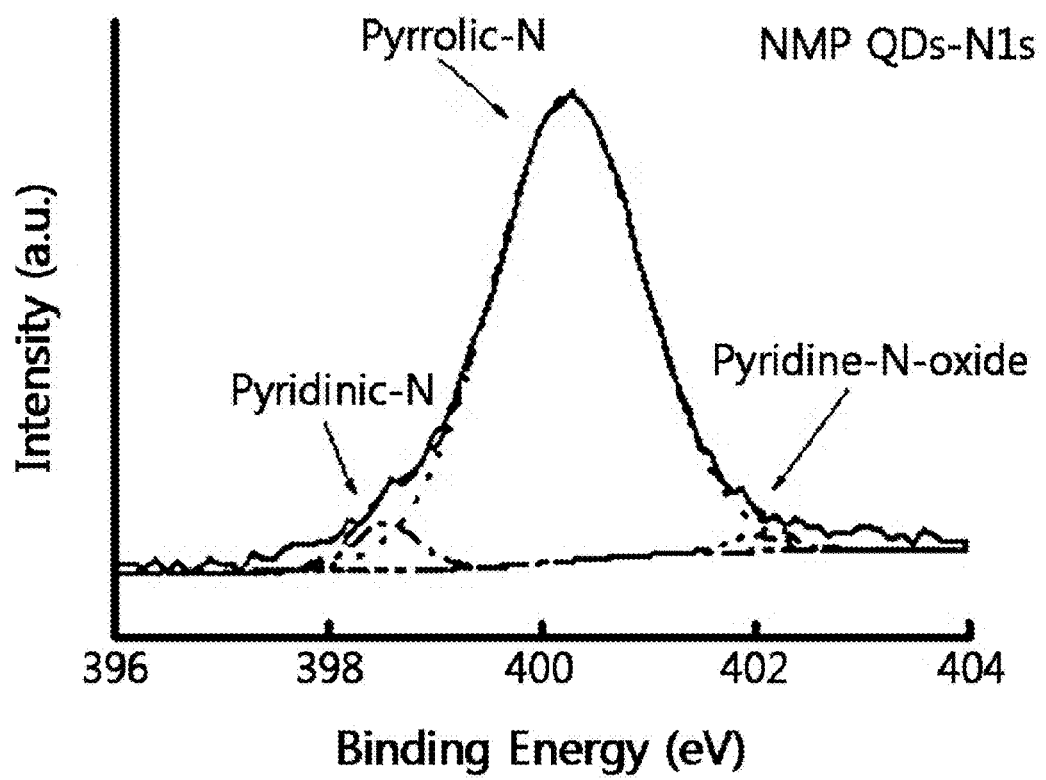

The solution containing the carbon nanostructures obtained according to Example 1 dispersed therein and the powder obtained by evaporation of the solution are analyzed in terms of their compositions, and the results are shown in FIG. 5A and FIG. 5B.

Referring to FIG. 5A and FIG. 5B, it can be seen that C—N bonds and pyrrolic-N, pyridinic-N and pyridine-N-oxide bonds are produced, which suggests that the carbon nanostructure according to Example 1 is doped with nitrogen due to the decomposition of the solvent.

Test Example 3: Determination of Dispersibility and Light Emission Characteristics of Carbon Nanostructures The solution containing the carbon nanostructures according to Example 1 dispersed therein is determined for the dispersibility of carbon nanostructures and light emission characteristics. The results are shown in FIG. 6 and FIG. 7.

Figure 6:
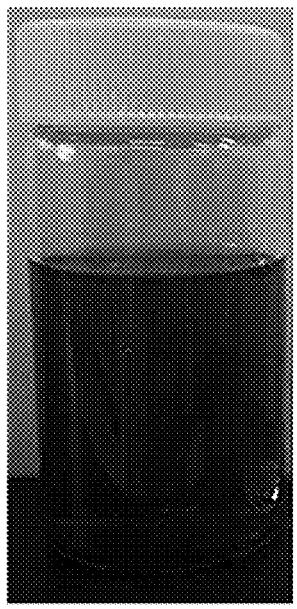
FIG. 6 is a photograph illustrating the dispersion state of the solution containing the carbon nanostructure according to an embodiment.
Figure 7:
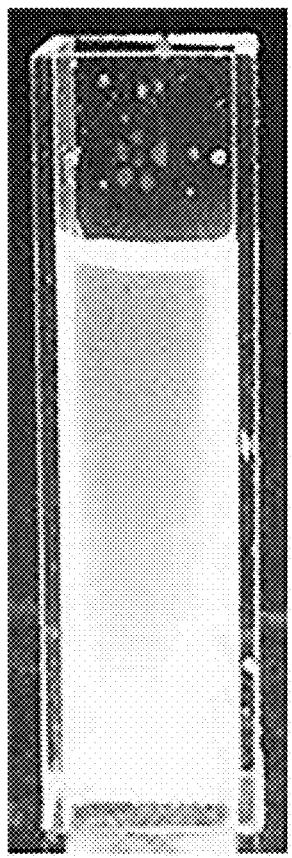
FIG. 7 is a photograph illustrating the light emission image of the solution containing the carbon nanostructure according to an embodiment.
Figure 8A:
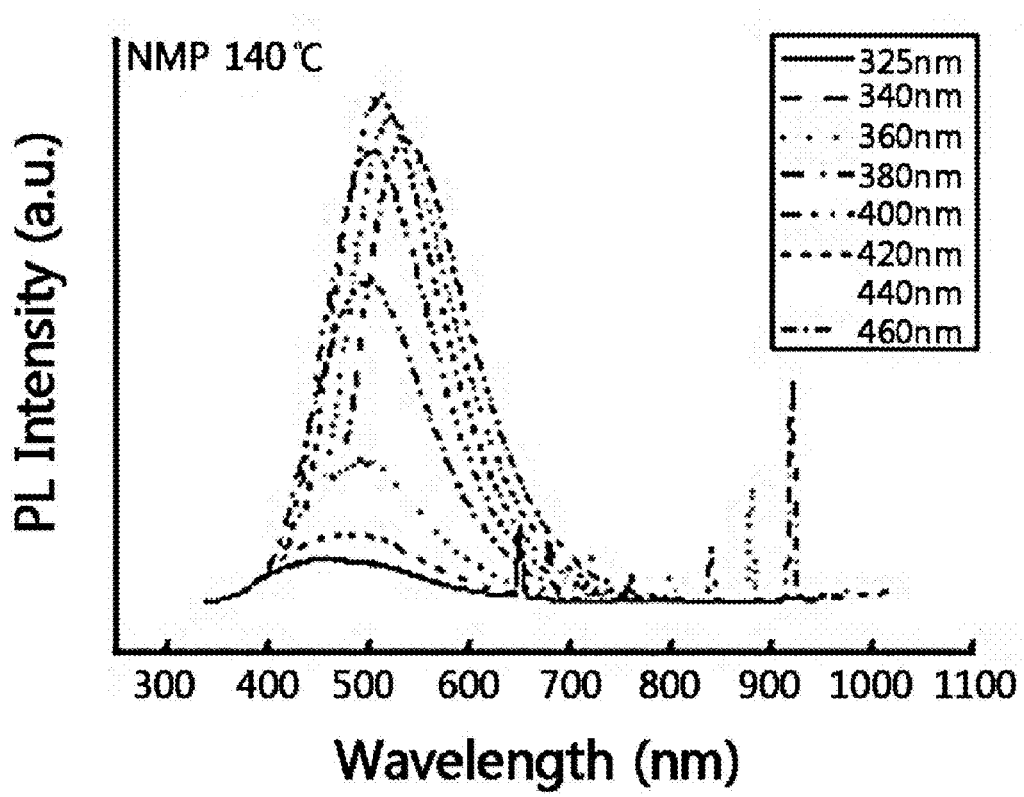
FIG. 8A to FIG. 8D show graphs illustrating the PL spectra of the carbon nanostructure according to an embodiment as a function of reaction temperature.
Figure 8B:
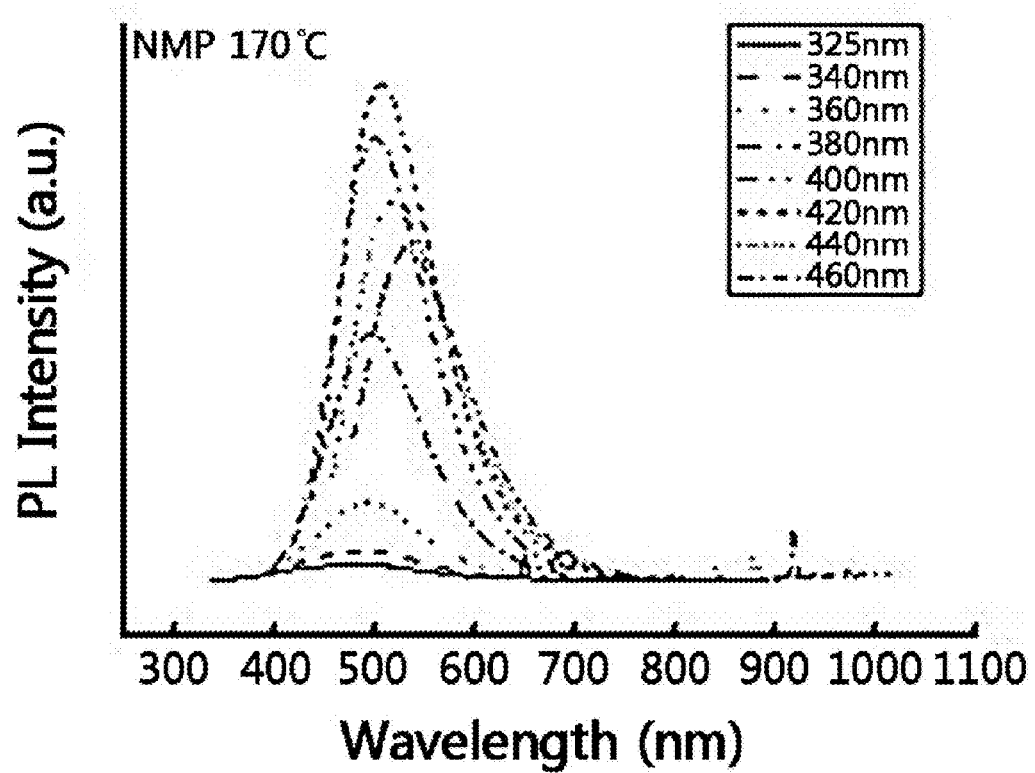
Figure 8C:
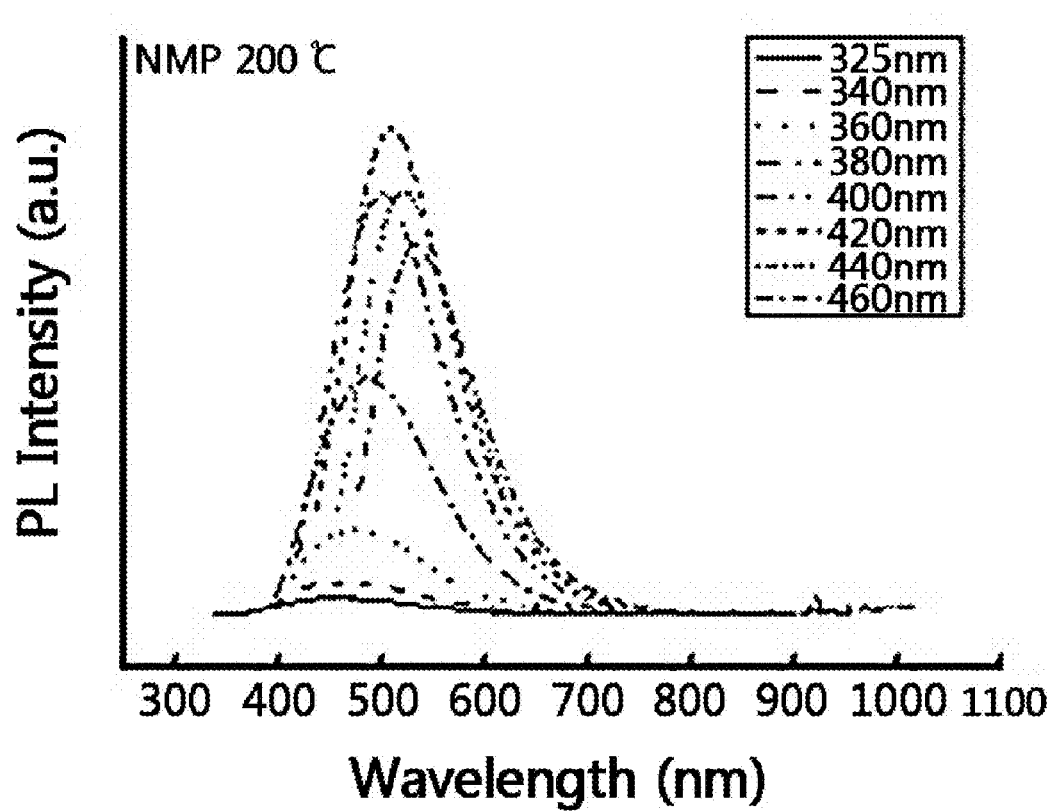
Figure 8D:
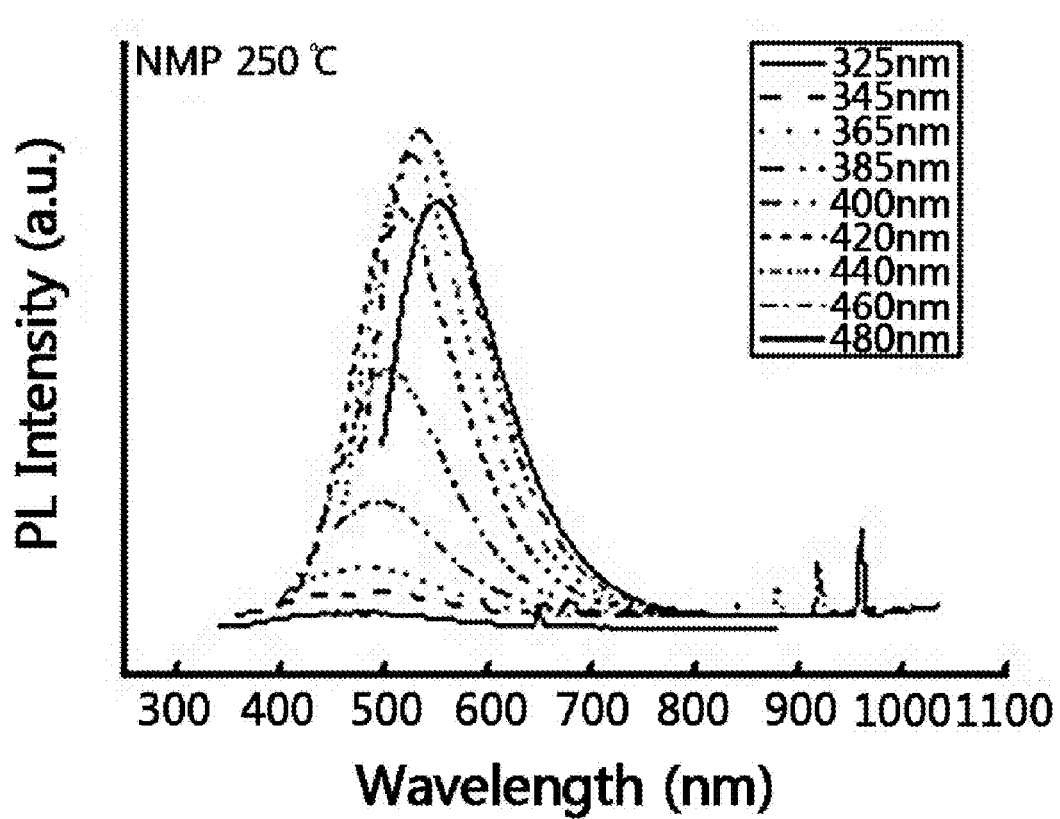

Referring to FIG. 6, it can be seen that the carbon nanostructures according to Example 1 are dispersed very homogeneously in the solution. In addition, as can be seen from FIG. 7, the carbon nanostructures according to Example 1 show excellent light emission characteristics in the dark place.

Test Example 4: Light Emission Test of Carbon Nanostructures Depending on Temperature The solutions containing the carbon nanostructures according to Examples 1 to 5 dispersed therein are subjected to a test for determining light emission characteristics. The results are shown in FIGS. 8A to 8D and FIG. 9.

Figure 9:
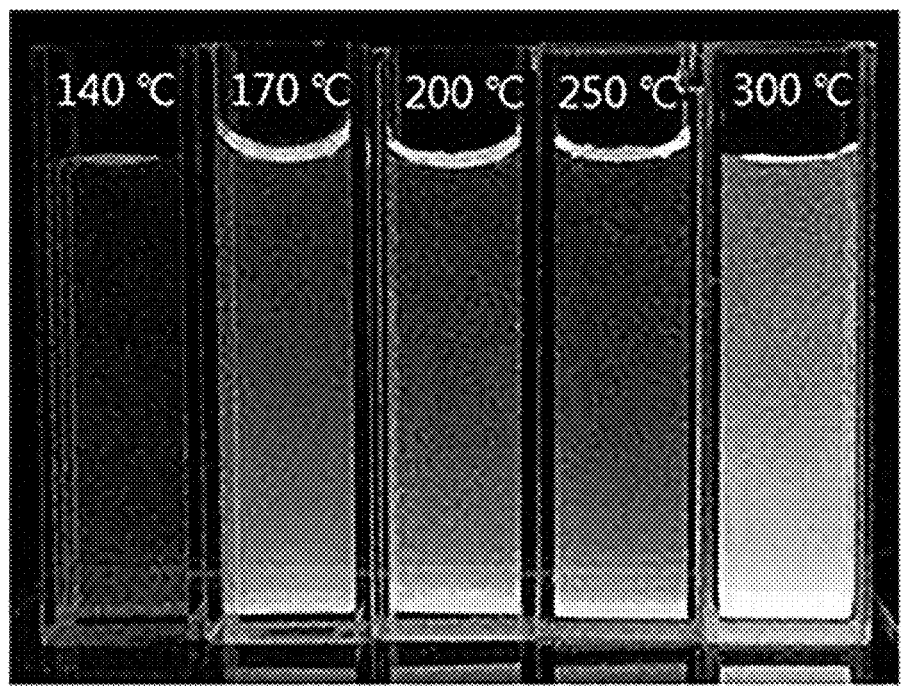
FIG. 9 is a photograph illustrating the light emission image of the solution containing the carbon nanostructure according to an embodiment as a function of reaction temperature.

FIG. 8A to FIG. 8D show the graphs illustrating the PL spectra of the carbon nanostructure according to an embodiment as a function of reaction temperature, and FIG. 9 is a photograph illustrating the light emission image of the solution containing the carbon nanostructure according to an embodiment as a function of reaction temperature.

Referring to FIG. 8A to FIG. 8D, as the heating temperature of the solution increases, the PL spectrum shifts toward a shorter wavelength. It is though that this is because an increase in temperature causes decomposition of the solvent to form a large amount of organic molecules and the core formation and growth proceed uniformly to form smaller materials.

In addition, referring to FIG. 9, it can be seen that as the heating temperature increases, the solution including the carbon nanostructures becomes blue-colored. It is thought that this is because the size of the carbon nanostructures is reduced.

Test Example 5: Light Emission Test of Carbon Nanostructures According to Comparative Example Depending on Temperature The solution containing the carbon nanostructures obtained according to Comparative Example 1 dispersed therein and the powder obtained by evaporation of the solution are analyzed in terms of their PL characteristics. The results are shown in FIG. 10.

Figure 10:
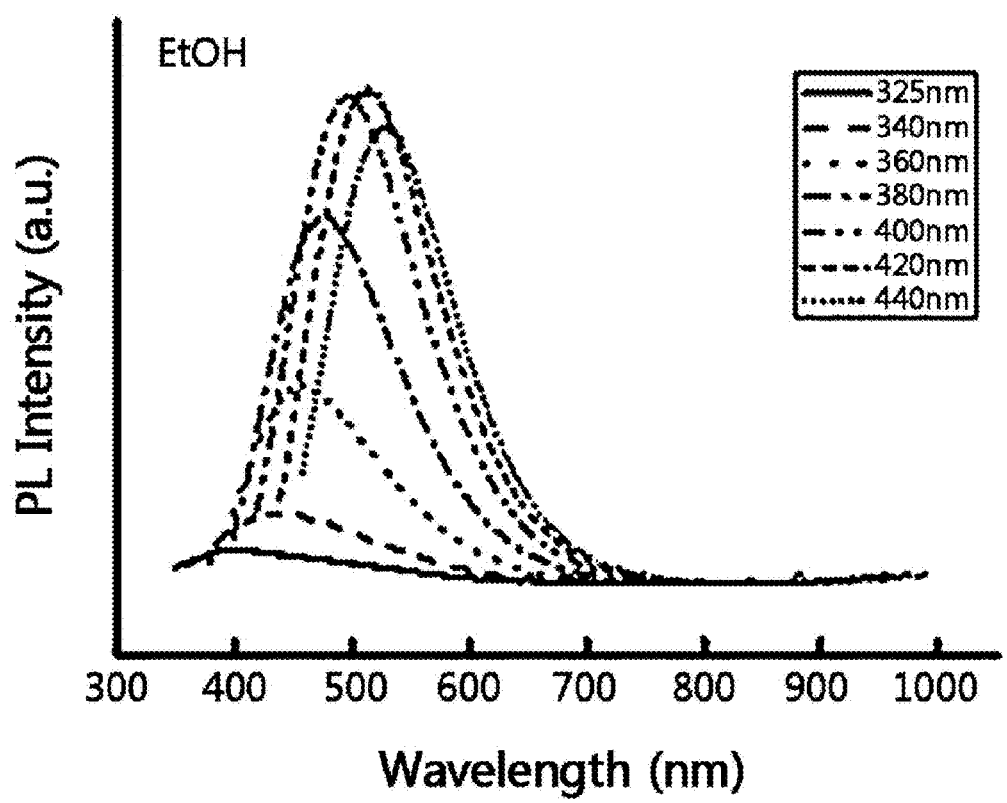
FIG. 10 is a graph illustrating the PL spectrum of the carbon nanostructure according to Comparative Example.
Figure 11A:
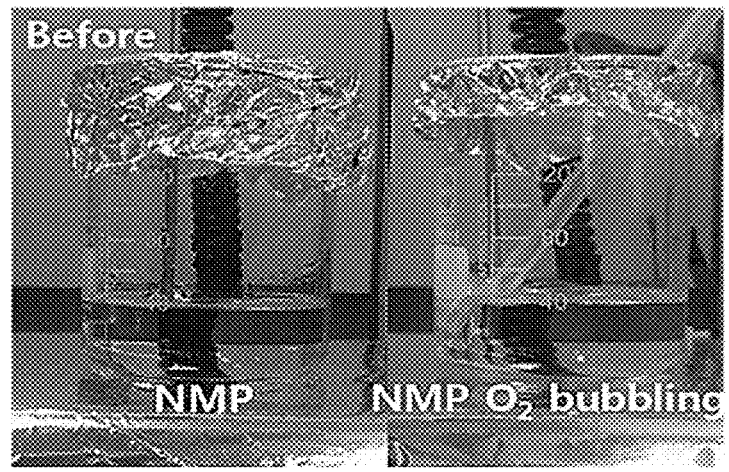
FIG. 11A to FIG. 11F show images of the solutions in which the carbon nanostructures are dispersed according to another embodiment, depending on reaction time.
Figure 11B:
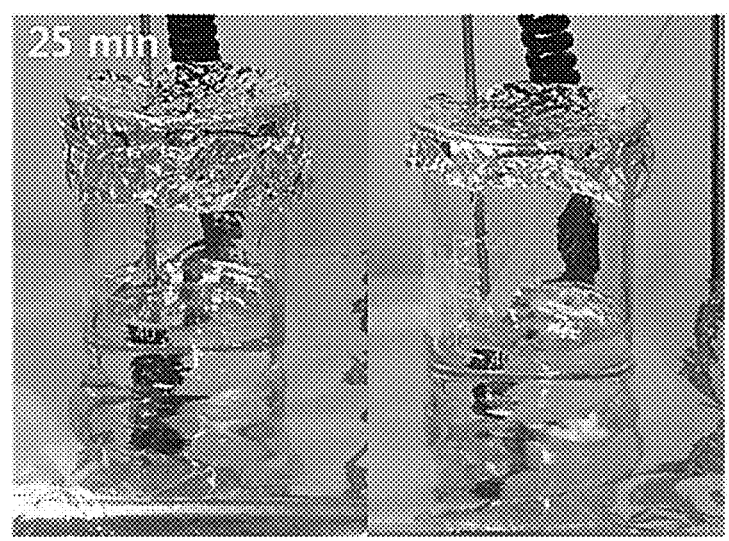
Figure 11C:
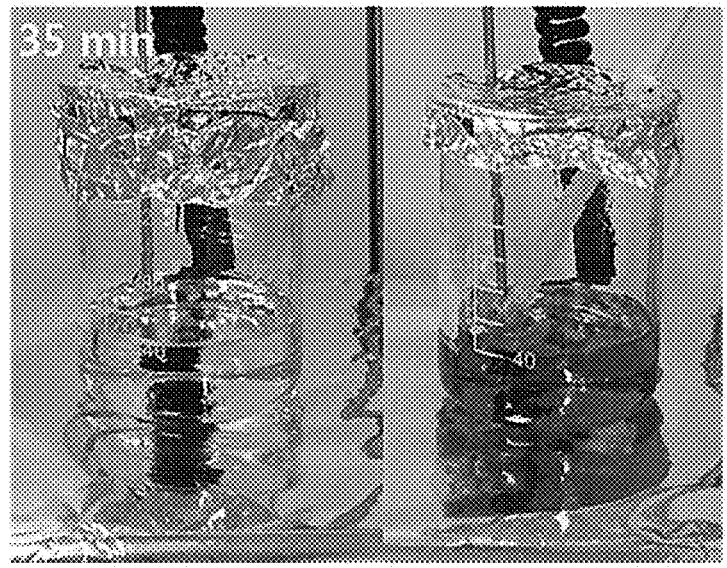
Figure 11D:
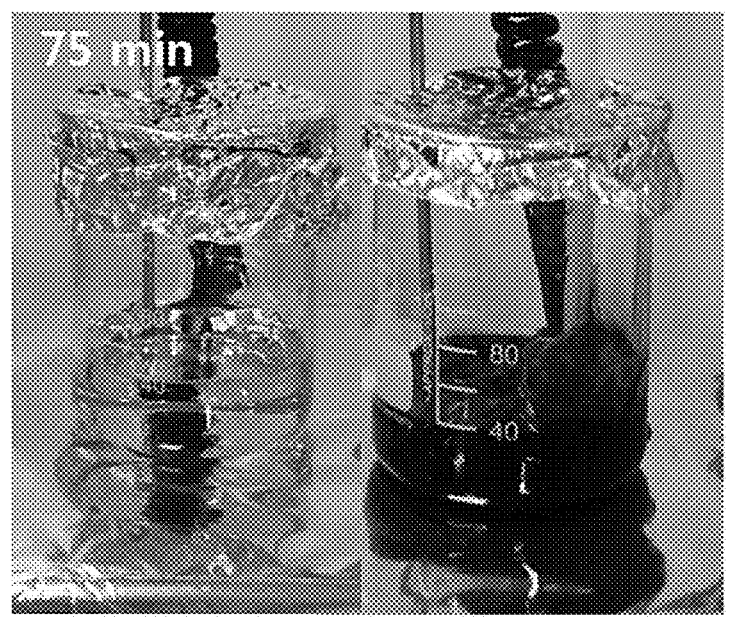
Figure 11E:
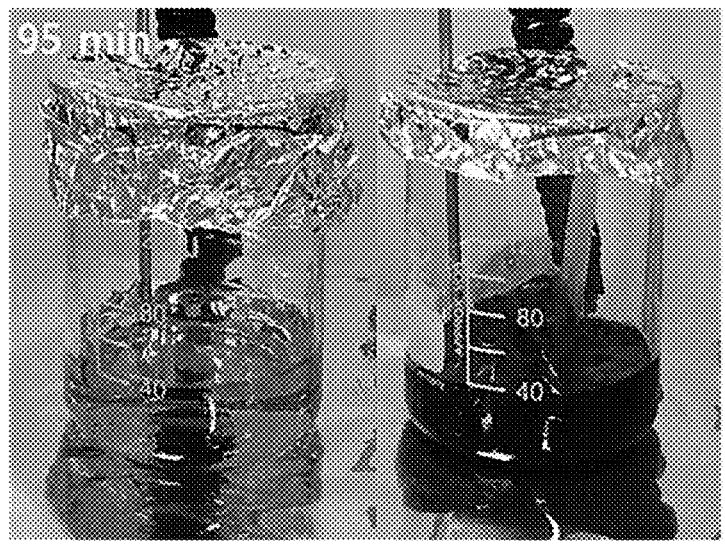
Figure 11F:
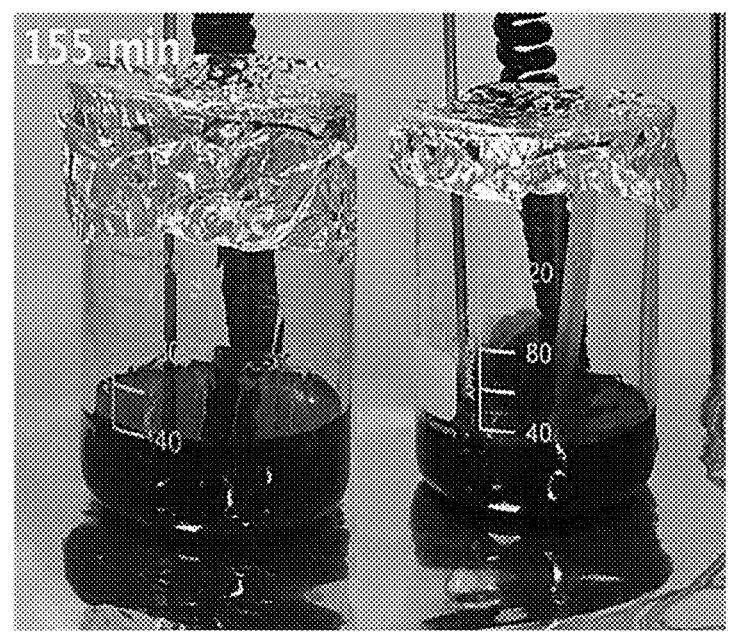

FIG. 10 is a graph illustrating the PL spectrum of the carbon nanostructure according to Comparative Example 1.

When comparing FIG. 3 with FIG. 10, it can be seen that the PL spectrum (FIG. 10) of the solution in which the carbon nanostructures obtained by using ethanol are dispersed show characteristics different from the PL spectrum (FIG. 3) of the carbon nanostructures obtained by using NMP as solvent under the same conditions. This demonstrates that carbon nanostructures having a different constitution are formed depending on type of solvent.

Test Example 6: Preparation of Carbon Nanostructures Including Introduction of Oxygen The carbon nanostructures according to Examples 6 and 7 are tested to determine whether carbon nanostructures are formed or not as a function of time. The results are shown in FIG. 11A to FIG. 11F.

Figure 12:
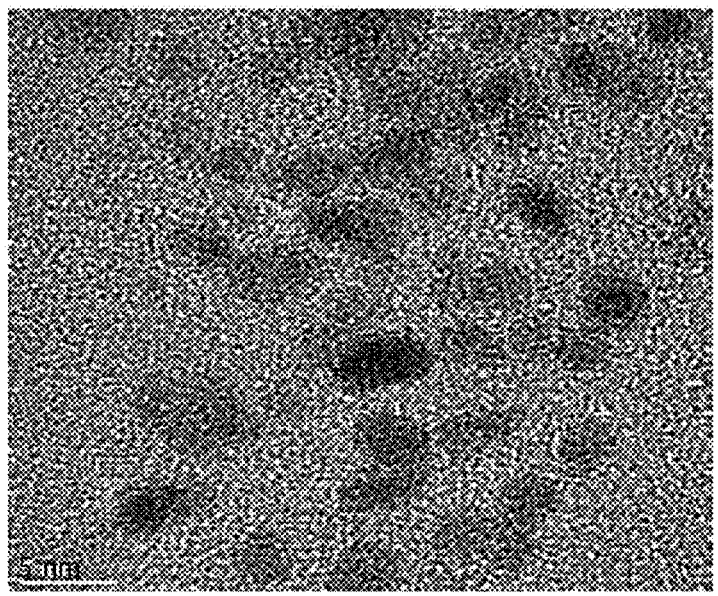
FIG. 12 is a photograph illustrating the TEM image of the carbon nanostructure according to another embodiment.

FIG. 11A to FIG. 11F show images illustrating the results of observation of the carbon nanostructures prepared according to an embodiment. FIG. 12 is a photograph illustrating the TEM image of the carbon nanostructure according to Example 7.

Referring to FIG. 11A to FIG. 11F, it can be seen that when NMP is introduced to a reaction container and heated to 170° C., the NMP solution turns red, which demonstrates that carbon nanostructures are formed even under ambient pressure.

It can be also seen that carbon nanostructures are formed when oxygen gas is introduced continuously during the reaction (the right portions of FIG. 11A to FIG. 11F and FIG. 12), and the reaction proceeds more rapidly.

Test Example 7: Test for Determining Crystallinity of Dried Carbon Nanostructures The carbon nanostructures according to Example 6 are concentrated to 6 times of the original concentration to determine whether carbon particles precipitate or not in the solution containing the carbon nanostructures. Then, the solution is dried completely and analyzed by Raman spectroscopy.

Figure 13:
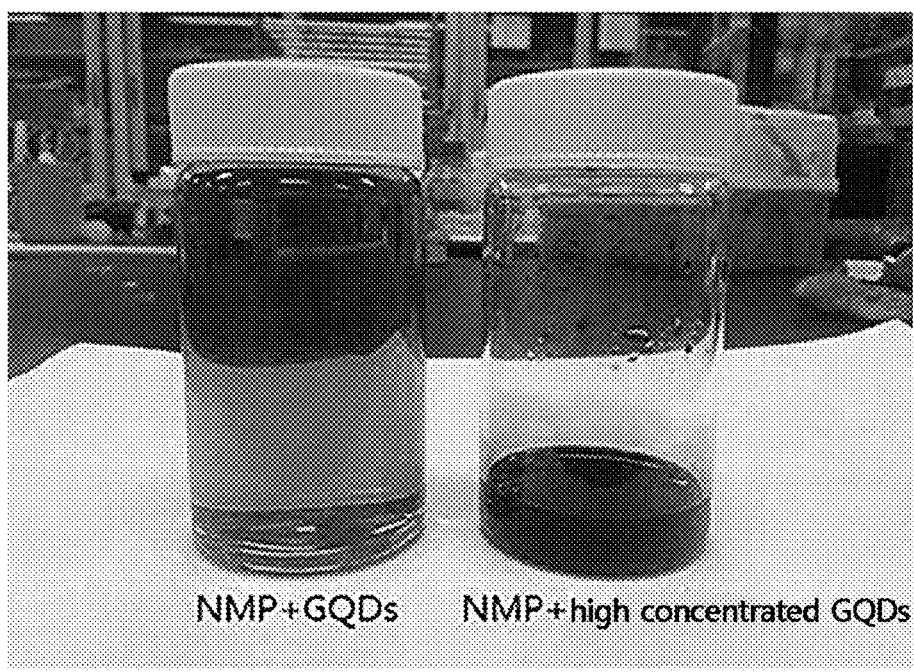
FIG. 13 is a photograph illustrating the carbon nanostructure (left side) according to another embodiment and the solution of the carbon nanostructure concentrated to 6× (right side).
Figure 14:
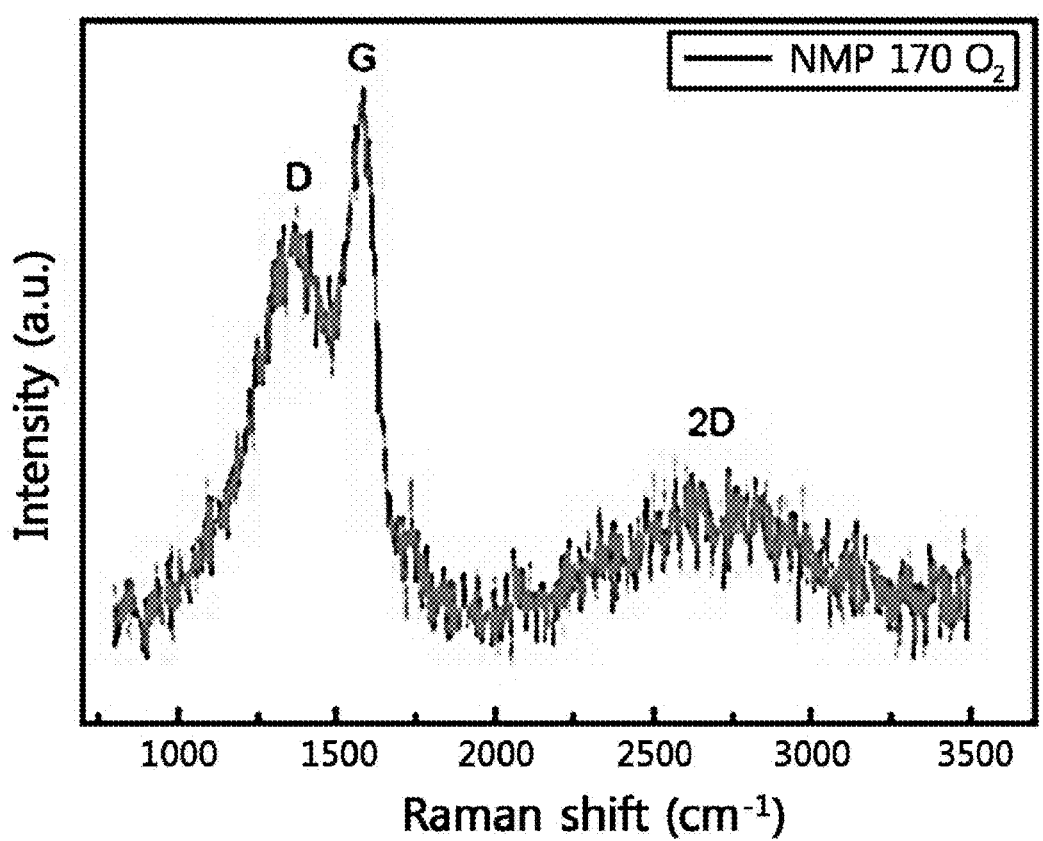
FIG. 14 is a graph illustrating the Raman spectrum results determined after the carbon nanostructure according to another embodiment is dried completely.

FIG. 13 is a photograph illustrating the carbon nanostructure (left side) according to another embodiment and the solution of the carbon nanostructure concentrated to 6× (right side). FIG. 14 is a graph illustrating the Raman spectrum results determined after the carbon nanostructure according to another embodiment is dried completely.

Referring to FIG. 13, when the solution containing the carbon nanostructures prepared from NMP is concentrated to 6×, carbon particles precipitated in the solution are not observed. This demonstrates that the carbon nanostructures may be used as filler for high-concentration impregnation or highly conductive ink by using the above characteristics.

In addition, referring to FIG. 14, graphite peaks that are high G peaks are observed and amorphous peaks that are relatively low D peaks are also observed. This demonstrates that although the resultant carbon particles have a small size of 10-20 nm, they have high crystallinity and show high G peaks.

Test Example 8: Light Emission Test of Carbon Nanostructures

After the carbon nanostructures according to Example 6 are used to write letters on paper, light emission characteristics are observed and the results are shown in FIG. 15A to FIG. 15D.

Figure 15A:
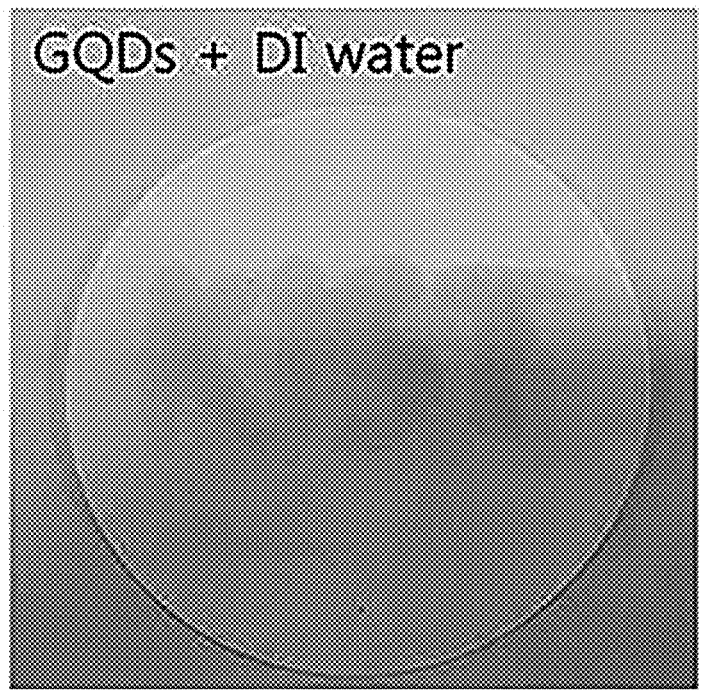
FIG. 15A to FIG. 15D show images of the letters written on paper with the carbon nanostructure according to another embodiment to observe the light emission characteristics.
Figure 15B:
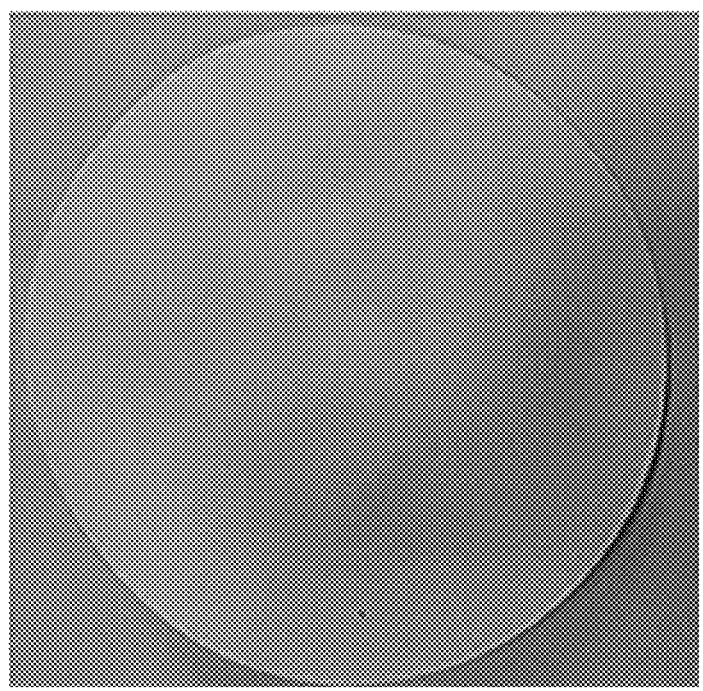
Figure 15C:
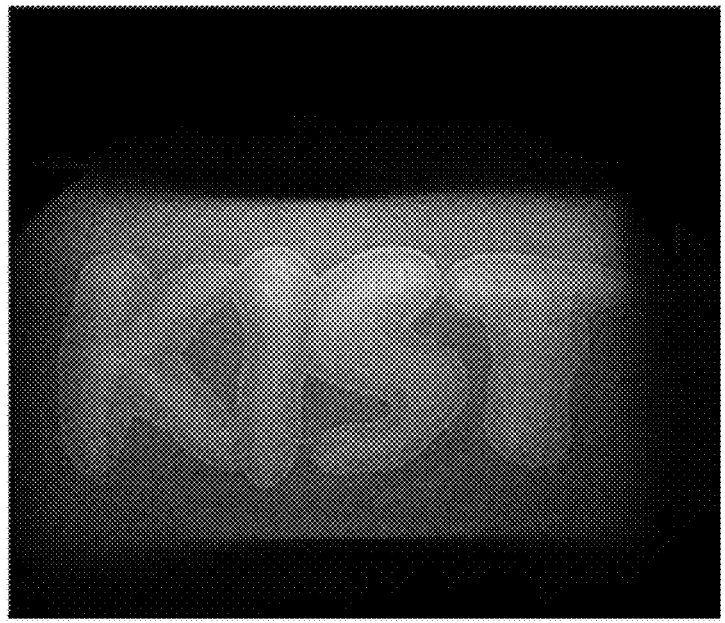
Figure 15D:
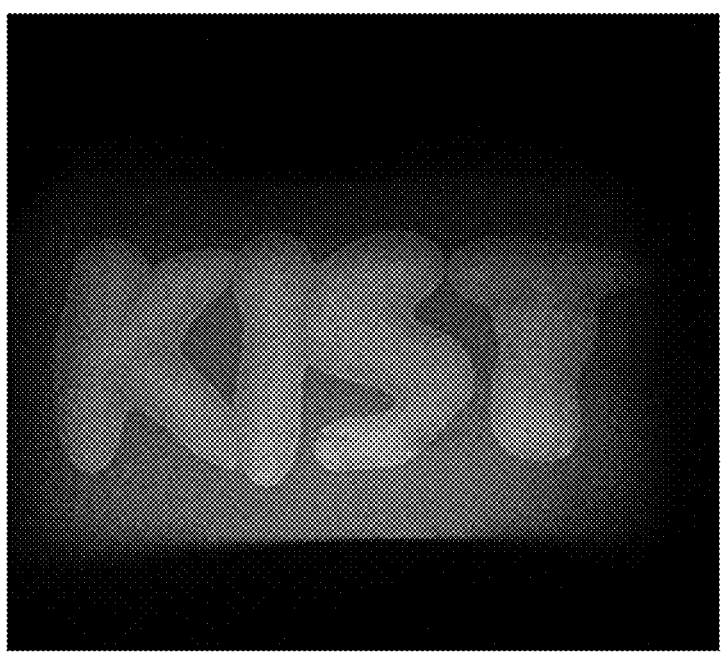

Particularly, FIG. 15A shows the image of the letters written on paper with a brush and the carbon nanostructures dispersed in water, and FIG. 15B shows the image obtained after water is dried completely. FIG. 15C and FIG. 15D show the images illustrating the results of the light emission characteristics observed with UV lamps having a wavelength of 365 nm and 254 nm, respectively.

It can be seen from FIG. 15A to FIG. 15D that the carbon nanostructures according to Example 6 show excellent light emission characteristics.

What is claimed is:

1. A carbon nanostructure comprising:
a carbon nanostructure core; and,
a plurality of organic molecules bound to and grown on the carbon nanostructure core,
wherein the carbon nanostructure core is a combination of the organic molecules,
wherein the organic molecules are decomposition products of an organic solvent selected from the group consisting of acetone, benzene, N-methyl-2-pyrrolidone (NMP), dimethyl formamide (DMF), dimethyl sulfoxide (DMSO), n-hexane, benzene, carbon tetrachloride, liquid carbon dioxide, carbon disulfide, liquid ammonia, and mixtures thereof wherein the carbon nanostructure is obtained by placing the organic solvent in a reactor and applying sufficient temperature and pressure to the organic solvent to carry out decomposition thereof, wherein the temperature to carry out decomposition is within the range of 40-800° C. and the pressure to carry out decomposition is within the range of 1-500 atm.

2. The carbon nanostructure according to claim 1, which is doped with a heteroatom.

3. The carbon nanostructure according to claim 2, wherein the heteroatom is at least one selected from the group consisting of nitrogen (N), fluorine (F), oxygen (O), phosphorus (P), boron (B), sulfur (S), chlorine (Cl), bromine (Br) and iodine (I), other than carbon (C).

4. The carbon nanostructure according to claim 1, wherein the organic solvent further comprises a metal or metal precursor, and the organic molecules are metal-organic molecules formed through the binding of a decomposition product of the metal or metal precursor with a decomposition product of the organic solvent.

5. The carbon nanostructure according to claim 4, which comprises a metal-carbon nanostructure core and the metal-organic molecules bound to and grown on the metal-carbon nanostructure core, wherein the metal-carbon nanostructure core is a combination of the metal-organic molecules.

6. The carbon nanostructure according to claim 4, which is a decomposition product of a metal-carbon precursor, wherein the metal-carbon precursor is a combination of the metal-organic molecules.

7. The carbon nanostructure according to claim 4, wherein the metal is at least one selected from the group consisting of platinum (Pt), ruthenium (Ru), copper (Cu), iron (Fe), nickel (Ni), cobalt (Co), palladium (Pd), tungsten (W), iridium (Ir), rhodium (Rh), strontium (Sr), cesium (Ce), praseodymium (Pr), neodymium (Nd), samarium (Sm), rhenium (Re), magnesium (Mg), boron (B) and aluminum (Al), and the metal precursor is at least one selected from the group consisting of $CuCl_2$, $CoCl_2$, $OsCl_3$, $CrCl_3$, $(NH_3)_6RuCl_3$, $FeCl_3$, $NiCl_2$, $PdCl_2$, $RuCl_3$, $H_2PtCl_6$, $Pd(NO_3)_2$, $(NH_3)_4Pt(NO_3)_2$, $Fe(NO_3)_3$, $Ni(NO_3)_2$, iron acetylacetonate, ferrocene and $Pt(acac)_2$.

8. The carbon nanostructure according to claim 1, wherein the solvent is NMP, and the organic molecule is at least one selected from the group consisting of methyl 5-oxo-L-prolinate, 1-methyl-5-oxo-2-pyrrolidinyl)methyl acetate, (2S)-2-(Methoxymethyl)-1-pyrrolidinecarbaldehyde, 5-(hydroxymethyl)-1-methyl-2-pyrrolidinone, 5-(hydroxyethyl)-1-methyl-2-pyrrolidinone, (2E)-N-Hydroxy-4-methyl-3-penten-2-imine, 1-butylpyrrolidin-2-one, 1-methyl-2-pyrrolidinone, 1-ethyl-2-pyrrolidinyl)methanol, 1-(1-ethyl-2-pyrrolidinyl)methanamine, 1-[(2R)-1-ethyl-2-pyrrolidinyl]methanamine, (5E)-7-vinyl-5-undecene, (2E, 9E)-2,9-undecadiene, N-ethyl-1-propanamine, N-methyl-N-nitro-1-(1-piperidinyl)methanamine, 3-(2-methyl-1-piperidinyl)-1-propanamine, 1,5-dimethyl-2-pyrrolidinone, (2S)-2-(methoxymethyl)-1-pyrrolidinecarbaldehyde, 1-(2-hydroxyethyl)-2-pyrrolidinone, 5-methyl-2-octyl-3(2H)-furanone, 3-hydroxy-3-phenylpropyl carbamate, 2-hydroxypropanoic acid, 4-penten-2-ol, N-(2-aminoethyl)acetamide, N-acetyl-N-methylacetamide, N-ethylformamide, 1-(3-hydroxypropyl)-2-pyrrolidinone and 1-ethyl-N-(2-formylphenyl)prolinamide.

9. The carbon nanostructure according to claim 1, which has a size of 0.1-100 nm.

* * * * *